United States Patent [19]
Lassota

[11] Patent Number: 5,943,944
[45] Date of Patent: Aug. 31, 1999

[54] BREWING SYSTEM WITH HOT WATER URN FLUSHING APPARATUS

[75] Inventor: Zbigniew G. Lassota, Long Grove, Ill.

[73] Assignee: Food Equipment Technologies Company, Inc., Lincolonshire, Ill.

[21] Appl. No.: 08/932,497

[22] Filed: Sep. 18, 1997

Related U.S. Application Data

[60] Provisional application No. 60/026,275, Sep. 18, 1996.

[51] Int. Cl.[6] ................................................ A47J 31/00
[52] U.S. Cl. ............................ 99/280; 99/290; 99/305; 99/304
[58] Field of Search ........................ 99/280, 305, 304, 99/290; 222/146.1, 146.2, 146.5

[56] References Cited

U.S. PATENT DOCUMENTS

| | | | |
|---|---|---|---|
| 4,579,048 | 4/1986 | Stover | 99/280 |
| 4,621,571 | 11/1986 | Roberts | 99/280 |
| 4,809,594 | 3/1989 | Vitous | 99/280 |
| 5,000,082 | 3/1991 | Lassota | 99/304 |
| 5,245,914 | 9/1993 | Vitous | 99/280 |
| 5,311,812 | 5/1994 | Smit | 99/280 |
| 5,584,229 | 12/1996 | Anson | 99/280 |
| 5,644,972 | 7/1997 | Dahmen et al. | 99/280 |
| 5,676,040 | 10/1997 | Ford | 99/280 |

*Primary Examiner*—Reginald L. Alexander
*Attorney, Agent, or Firm*—James W. Potthast

[57] ABSTRACT

A brewing system (30) with a water dispensing brew valve (176) for controlling the passage of water through the beverage ingredient (186) and a by-pass valve (170) for passage of hot water through a brew basket (180) but past the beverage ingredient (186) having a controller (158) with a brew start switch (50) for controlling the brew valve (176) also has a flush switch (54") for opening independently of the brew switch (50), the brew valve (176) and also the by-pass valve (170) to flush a dispenser urn (66).

10 Claims, 25 Drawing Sheets

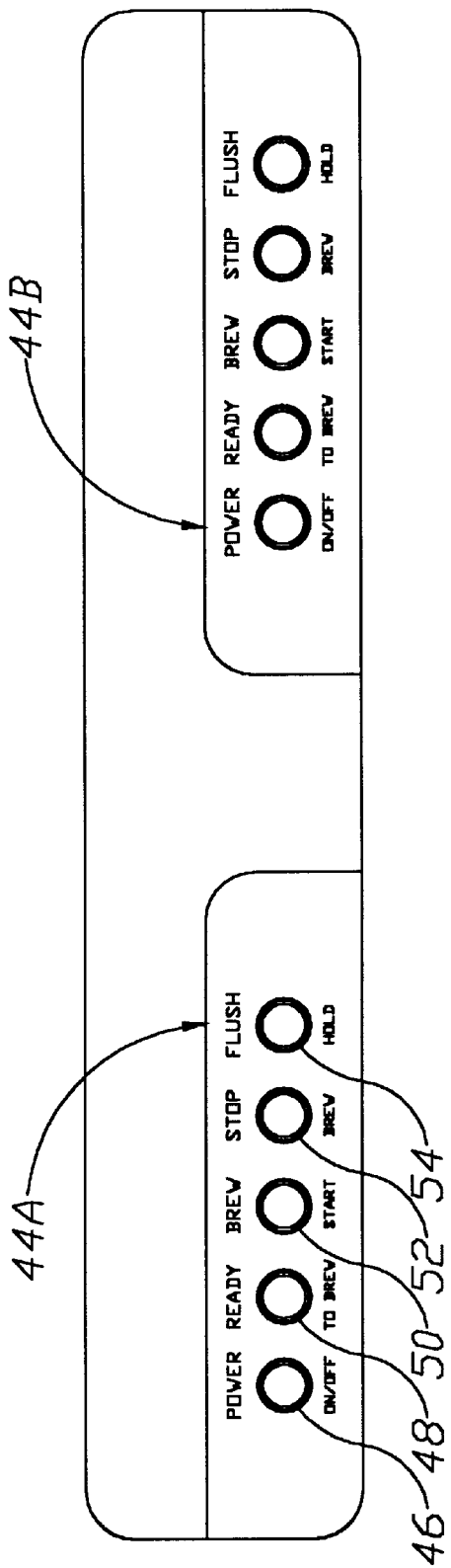

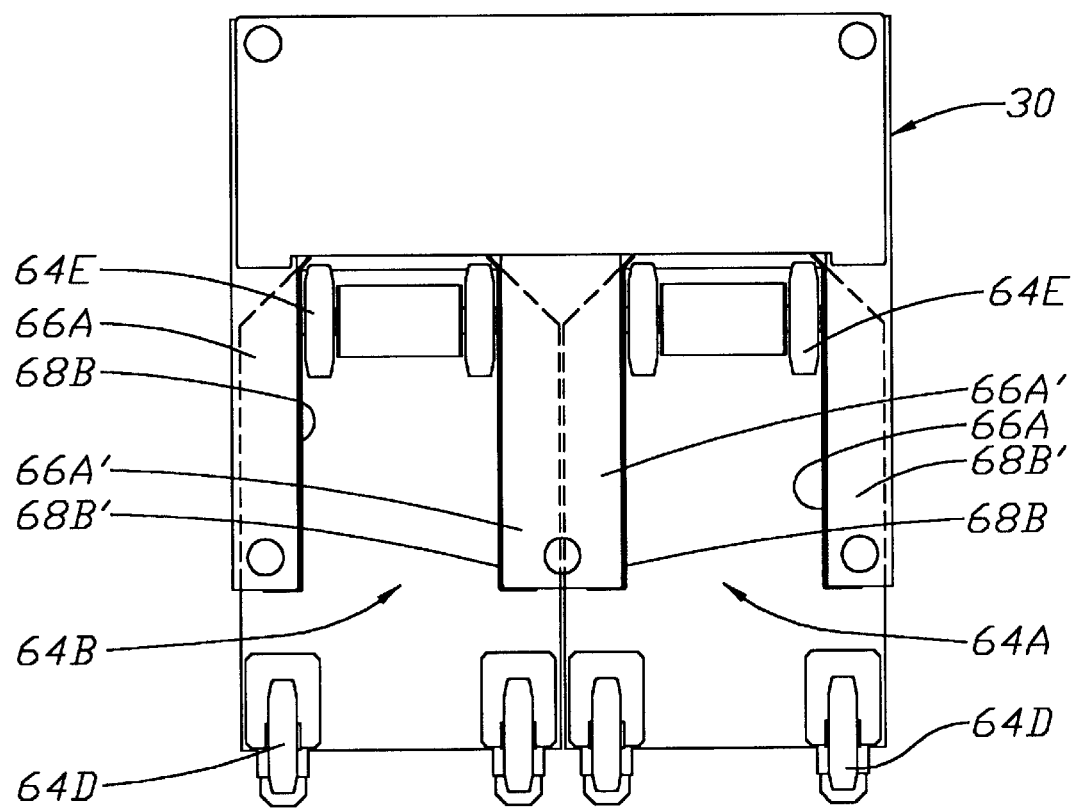

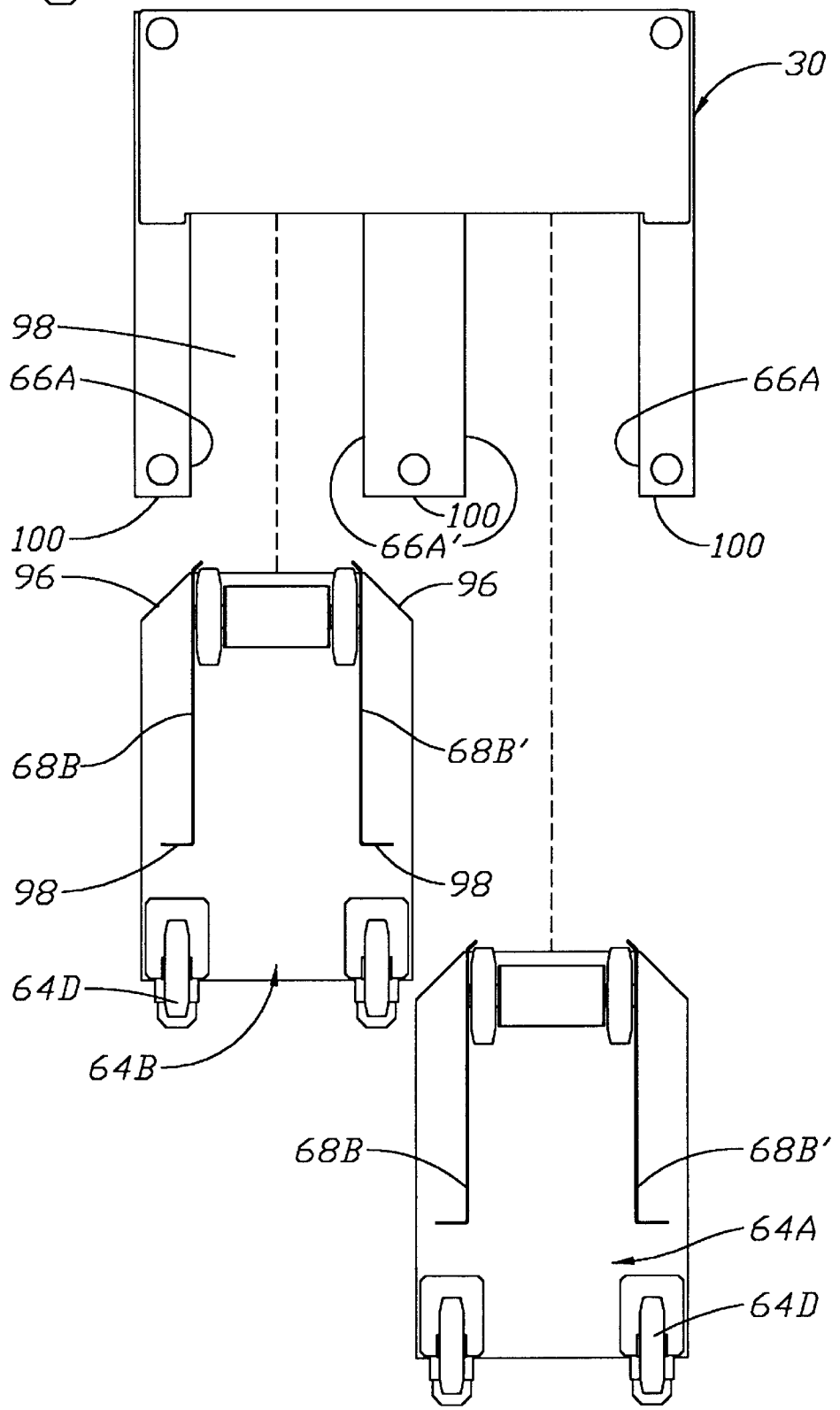

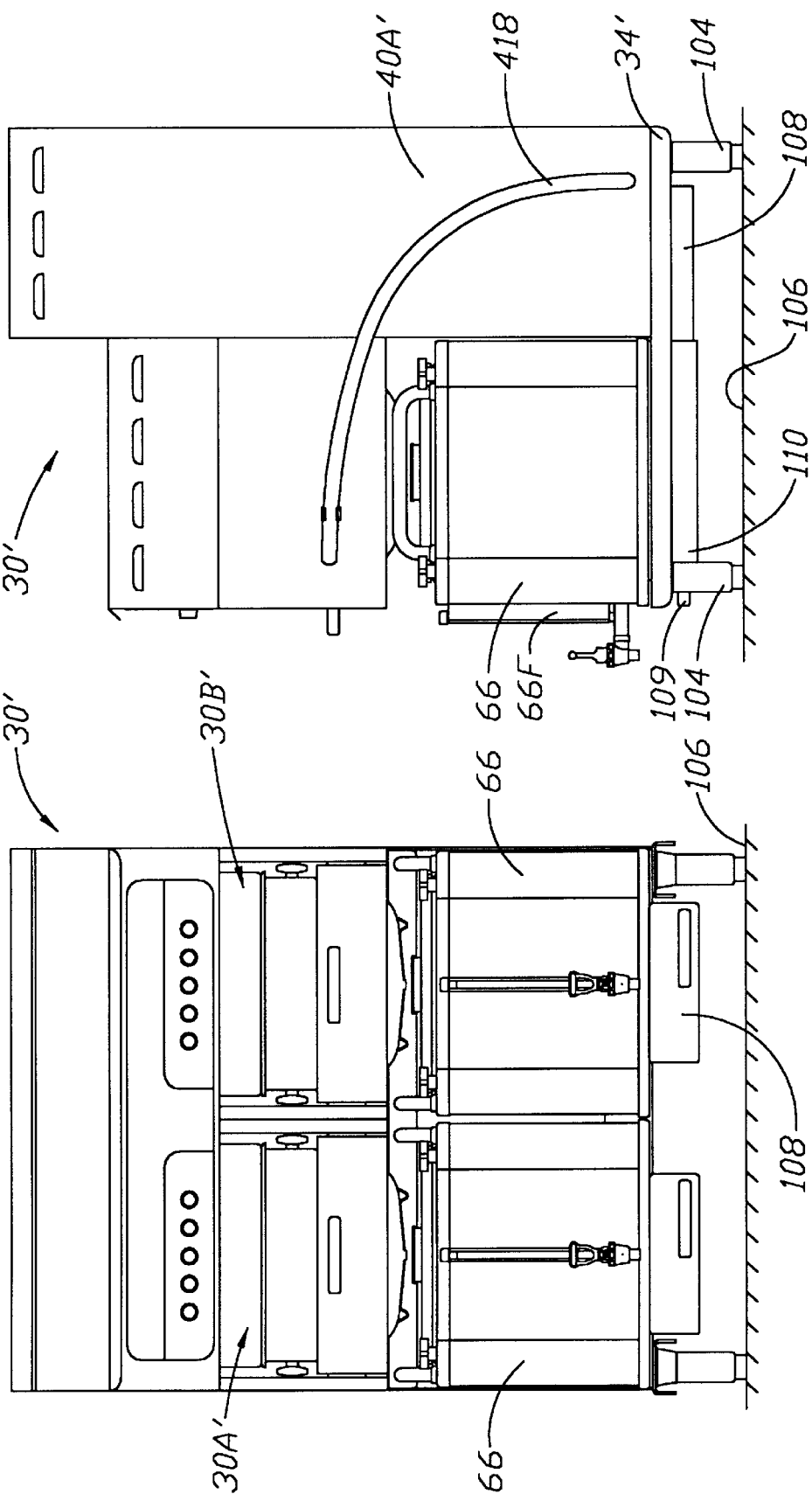

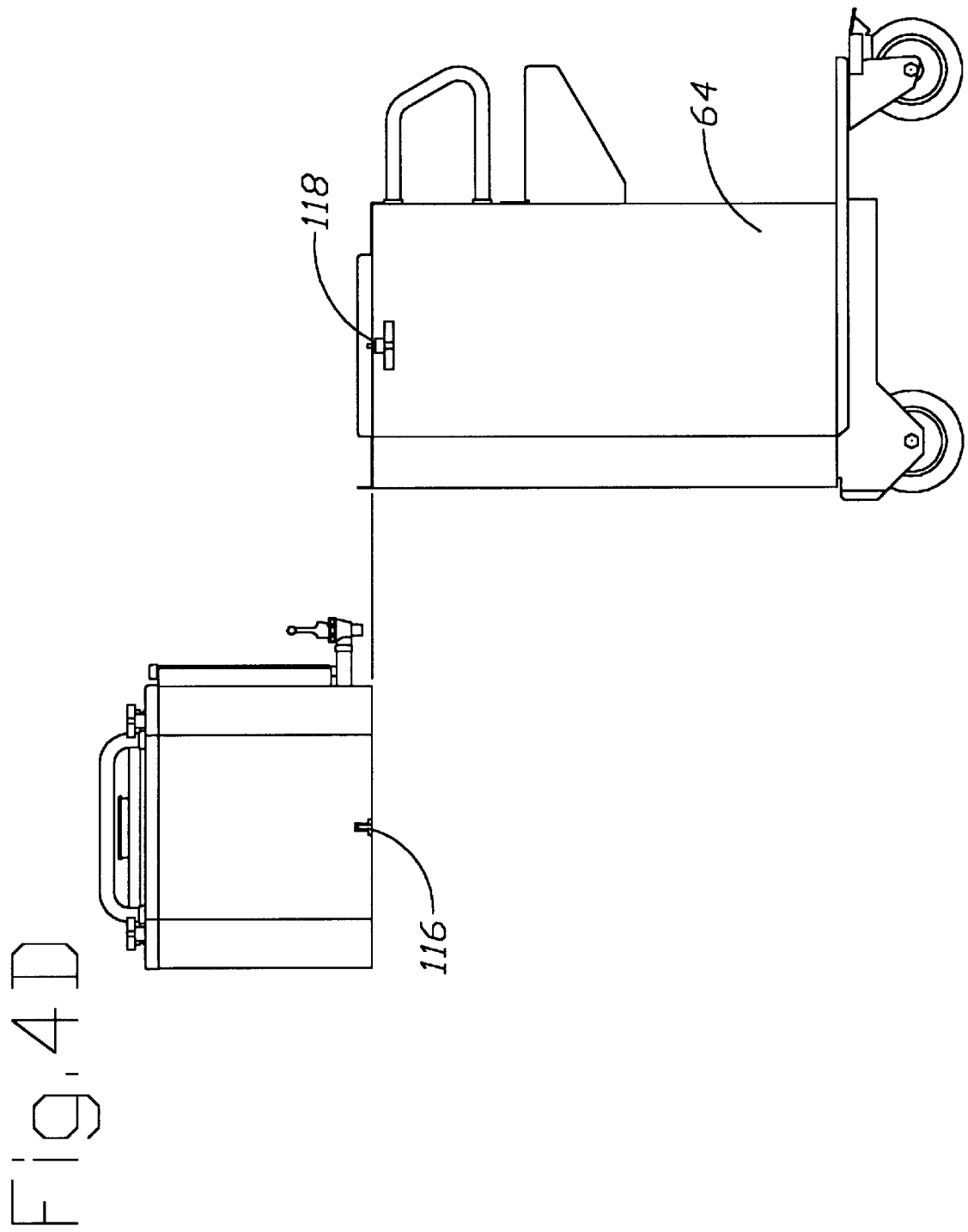

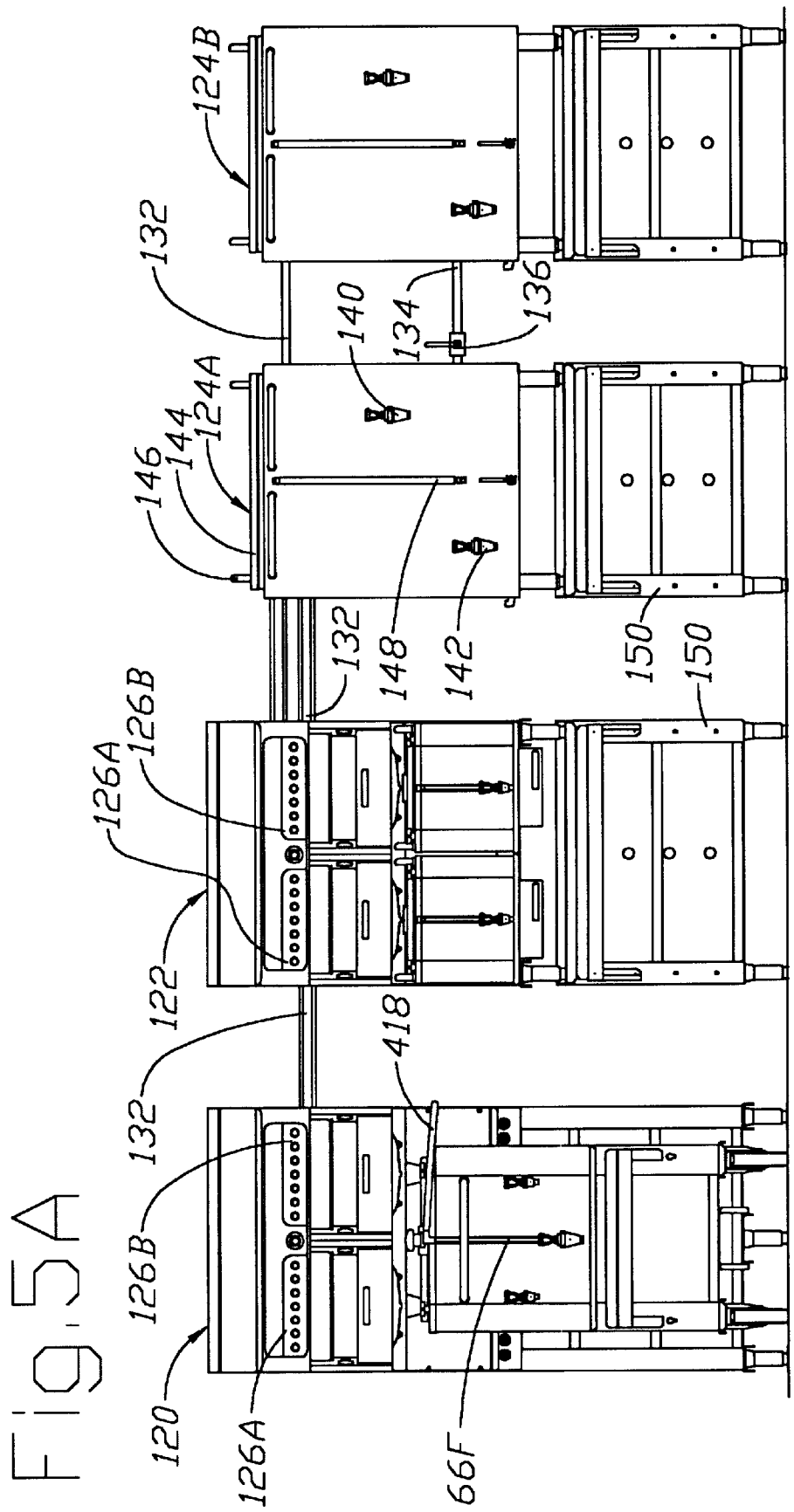

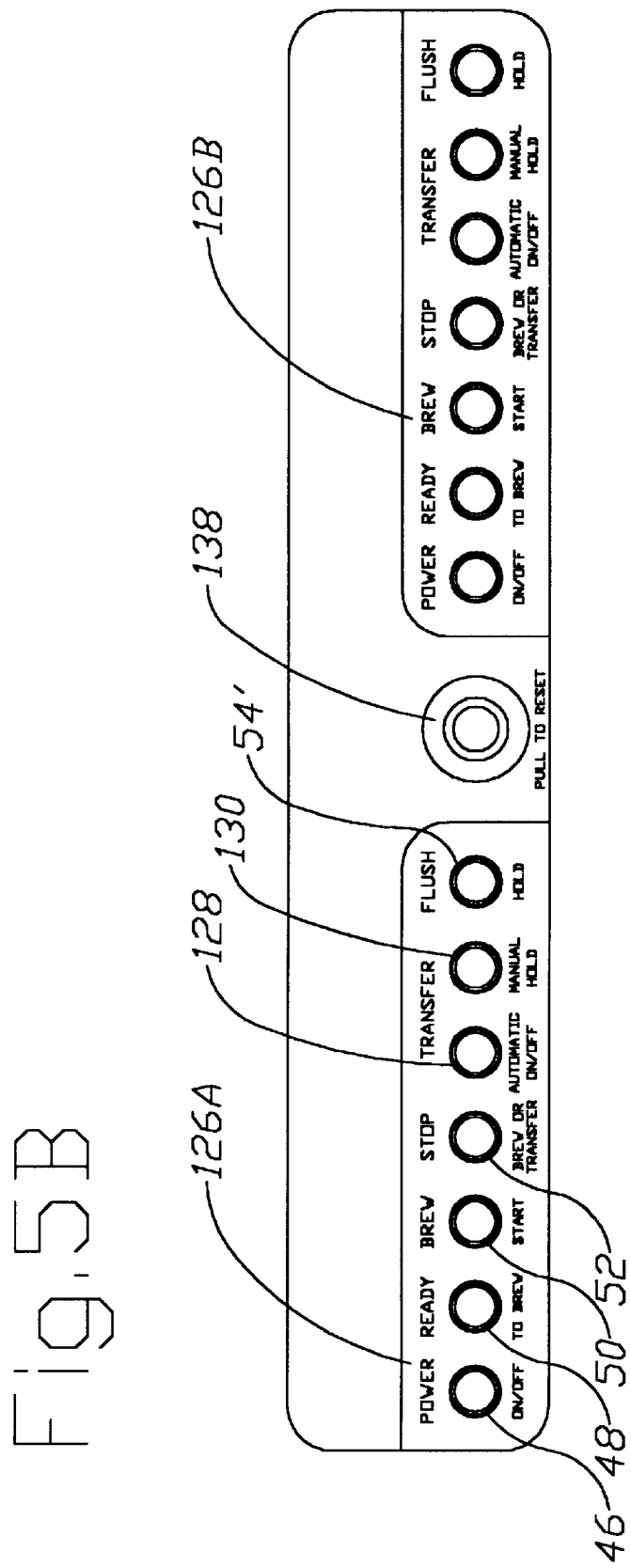

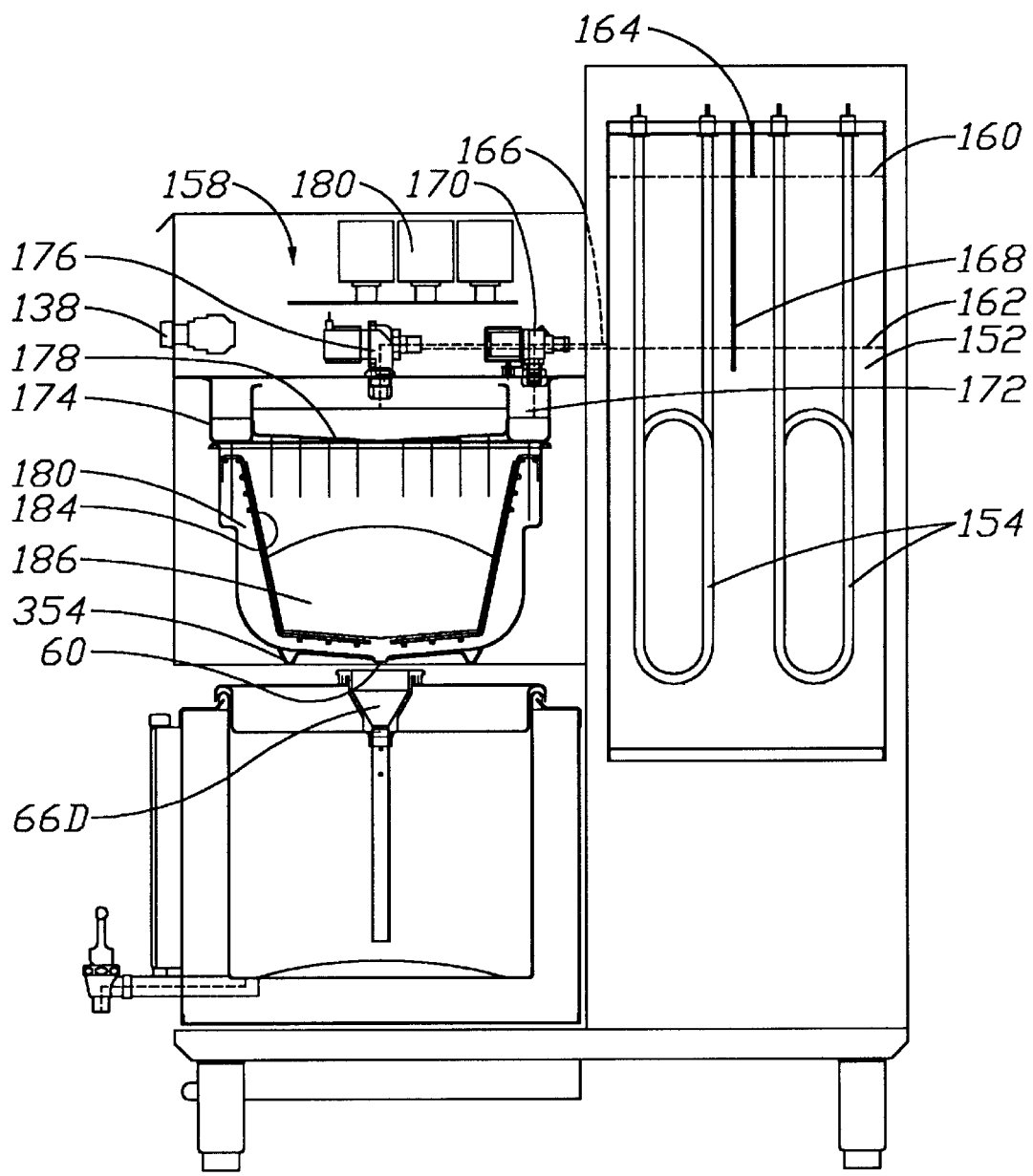

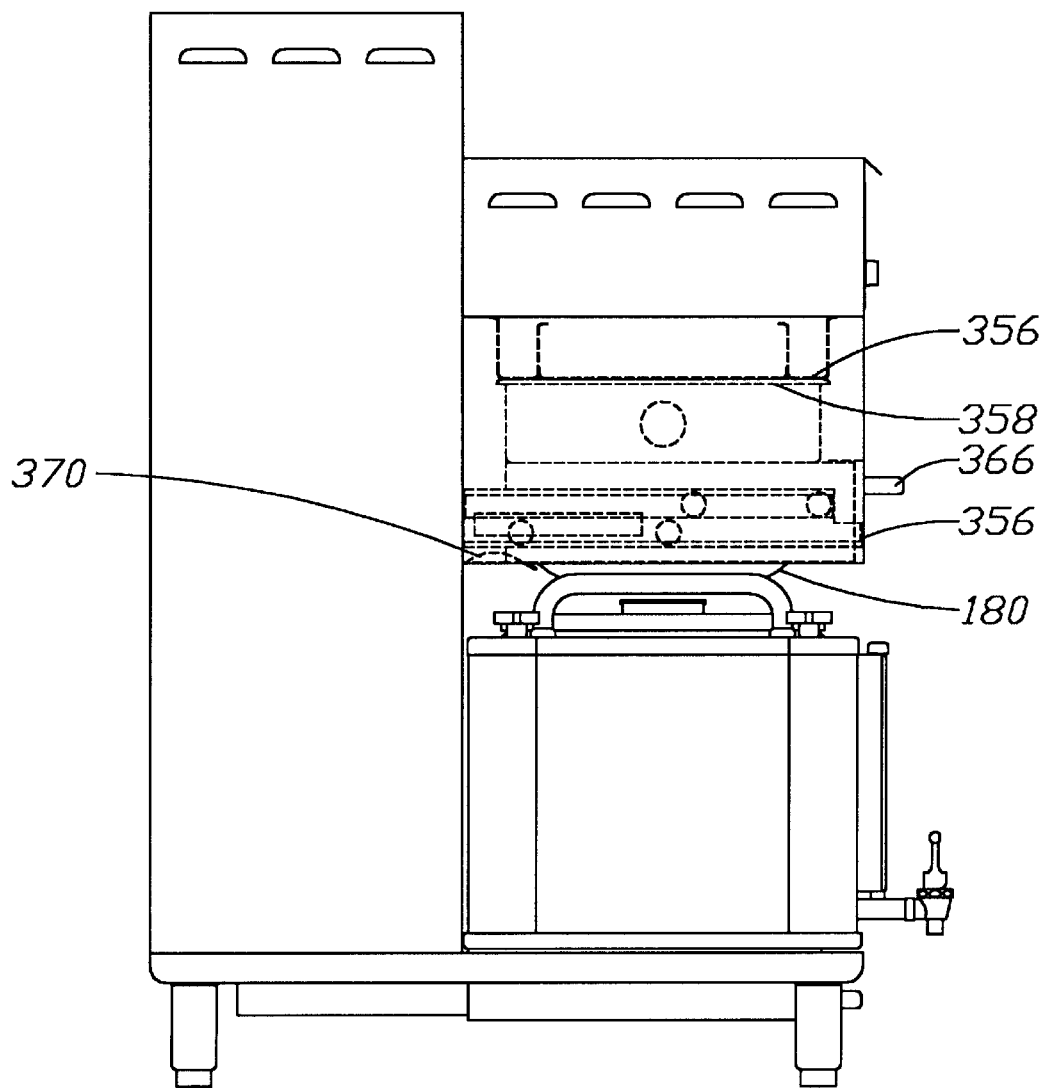

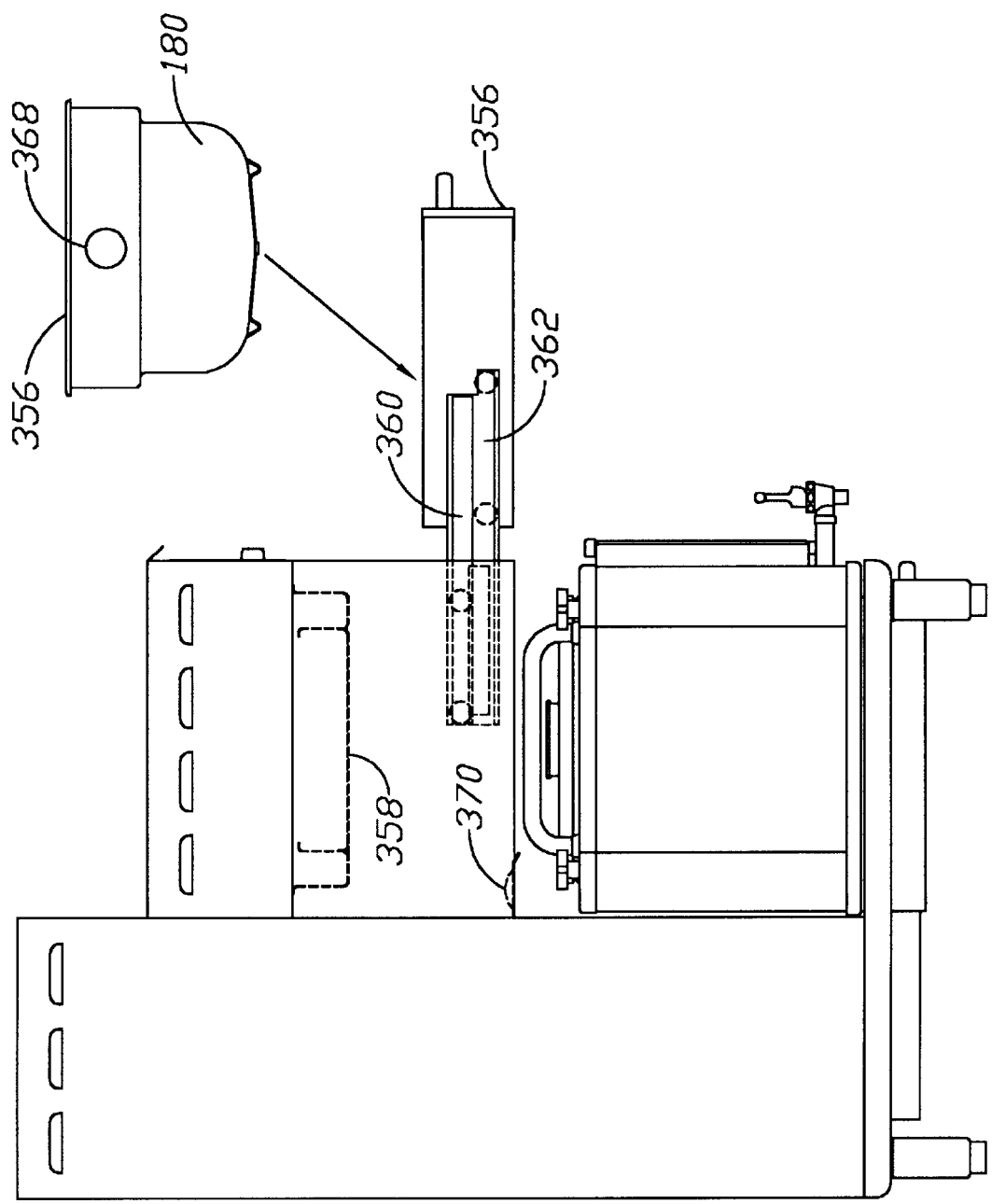

BREWING SYSTEM WITH HOT WATER URN FLUSHING APPARATUS

CROSS REFERENCE TO RELATED APPLICATION

This application claims the benefit of U.S. Provisional Application, No. 60/026,275, filed Sep. 18, 1996, and entitled "Brewer Systems, Apparatus and Methods of Operations and Use", the contents of which are hereby incorporated by reference.

BACKGROUND OF THE INVENTION

1. Field of the Invention

This invention relates to a brewing system with hot water urn flushing apparatus.

2. Description of the Related Art Including Information Disclosed Under 37 CFR 1.97–1.99

For large gatherings of people, such as conventions, large banquets, etc., there is a need for huge volume coffee production systems. These known systems produce six gallons of coffee at a time in six gallon removable urns and can also store up to two hundred forty gallons of coffee in one or more 60 gallon holding tanks to which the freshly brewed coffee is selectively automatically transferred. The removable urns have hot water filled liners in which the water is kept hot by means of an electrical, gas or other heating element. Likewise, the storage, or holding tanks, have liners in which is circulated the heated water to keep stored coffee hot.

The coffee is often brewed directly into a cold urn which can dramatically effect the serving temperature and reduce the amount of time the coffee will be at a presentable serving temperature.

Removable urns in known brewing systems must be kept warm by a hot water liner which circulates hot water through the thinly insulated hollow lining of the urn. These heated urns also require additional electrical power, not always readily available, at a remote serving site in addition to the power needed to heat the hot water holding tank.

Upon draining of the urn often there is residue, such as oils and stains, covering the interior surfaces of the urn which must be removed prior to storage or further use. This residue, if allowed to build up over time, can cause blockage of the serving valve and taint the taste of the freshly brewed beverage.

Cleaning of the urns requires a person to remove the rather heavy and cumbersome urn from a serving cart or counter top and into a large enough washing facility to clean the interior of the urn. Care must also be taken not to damage the heating elements during removal and cleaning.

Another disadvantage occurs during the initial startup of the brew cycle or the first brew of the day when the brewer, including the coffee drawer with the brew basket, the water pump, and any lines or hoses, are cold. This can affect the quality of the brew and can effect the duration of the presentable serving temperature of the freshly brewed beverage.

OBJECTS OF THE INVENTION

The principal object of the invention is to provide a high volume brewing system, apparatus and methods which overcome the above limitation and disadvantages of known high volume brewing systems by providing apparatus and method for flushing and preheating a thermally insulated urn with hot water.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 1C is an enlarge front elevational view of the control switch panels of FIG. 1A;

FIG. 2A is a bottom view of the preferred embodiment of the twin brewer assembly of FIG. 1A with a pair of single inlet dispenser carts engaged with the twin brewer assembly;

FIG. 2B is a bottom view of the twin brewer assembly of FIG. 1A but with the dispenser carts disengaged from the twin brewer assembly;

FIG. 4A is a front elevational view of the twin brewer assembly of FIG. 1A supported on a counter top with a pair of manually removable urns mounted in slidable drawers;

FIG. 4B is a side elevational view of the twin brewer assembly of FIG. 4A with the urn attached to the drawer in the closed position;

FIG. 4D is an exploded side elevational view of the urn of FIG.4A removed from the dispenser cart to better illustrate the mounting means;

FIG. 5A is a front elevational view of a preferred embodiment of a brewing system constructed in accordance with the present invention including a pair of twin brewers connected in series to a pair of holding tanks which store the freshly brewed beverage from the brewers;

FIG. 5B is an enlarged side elevational view of the control switch panel of the brewers of FIG. 5A;

FIG. 6A is a sectional side elevational view of the single brewer of FIG. 4E showing the interior components including the brew head and urn;

FIG. 10A is a sectional side view of the brew basket and movable brew basket support member of FIG. 1A with the brew basket in aligned sealed engagement with the by-pass/dispenser assembly;

FIG. 10C is a sectional side view similar to that of FIGS. 10A and 10B but in which the brew basket has been moved from alignment with the hot water dispenser for removal of the filter holder and storing the brew basket drainage hose.

DESCRIPTION OF THE PREFERRED EMBODIMENT

Figure 1A:
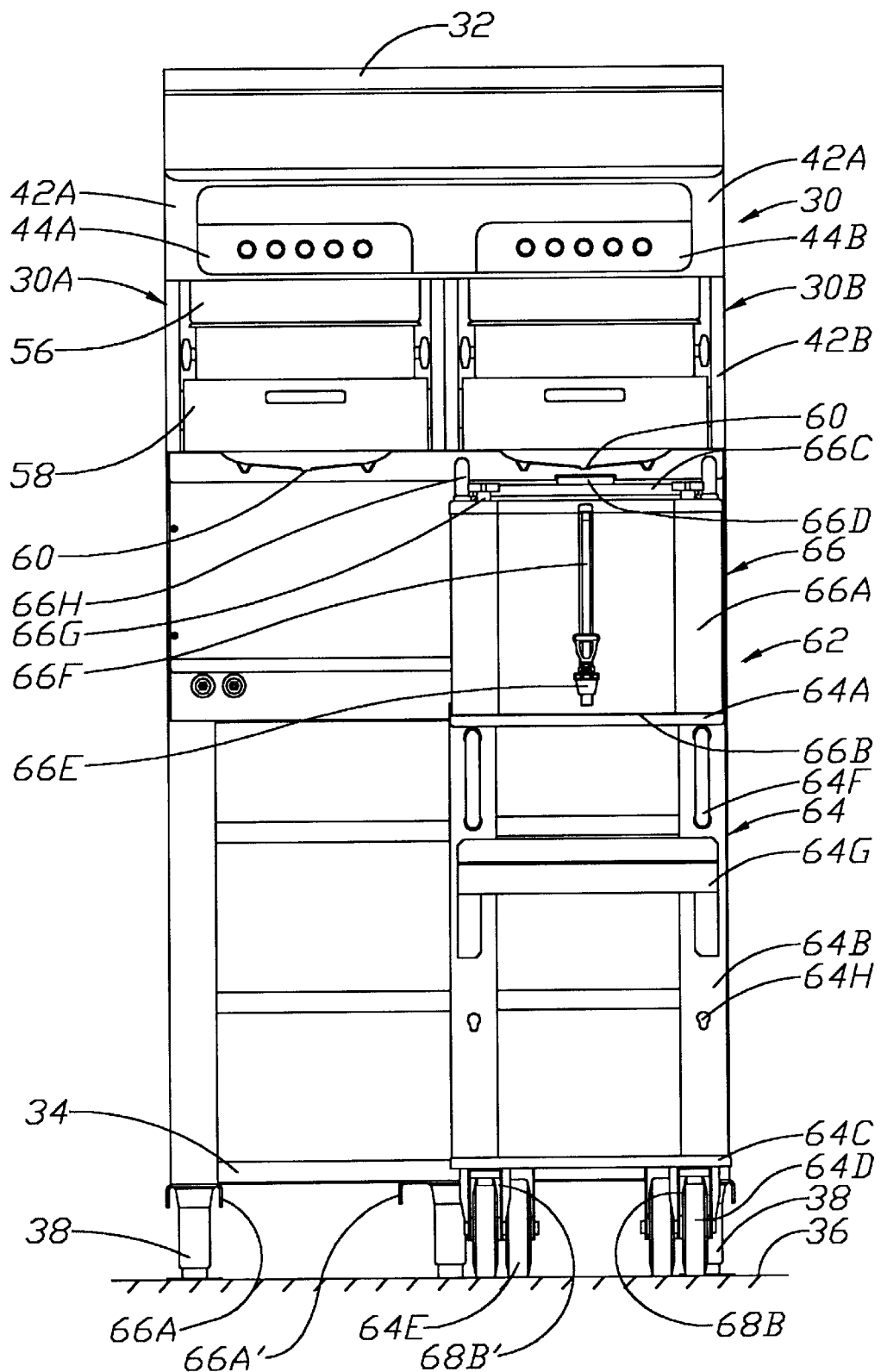
FIG. 1A is a front elevational view of a double brewer system comprised of a double brewer, a beverage storage tank and a transportable double brewer dispenser aligned beneath the brewer for receipt of brewed beverage.
Figure 1B:
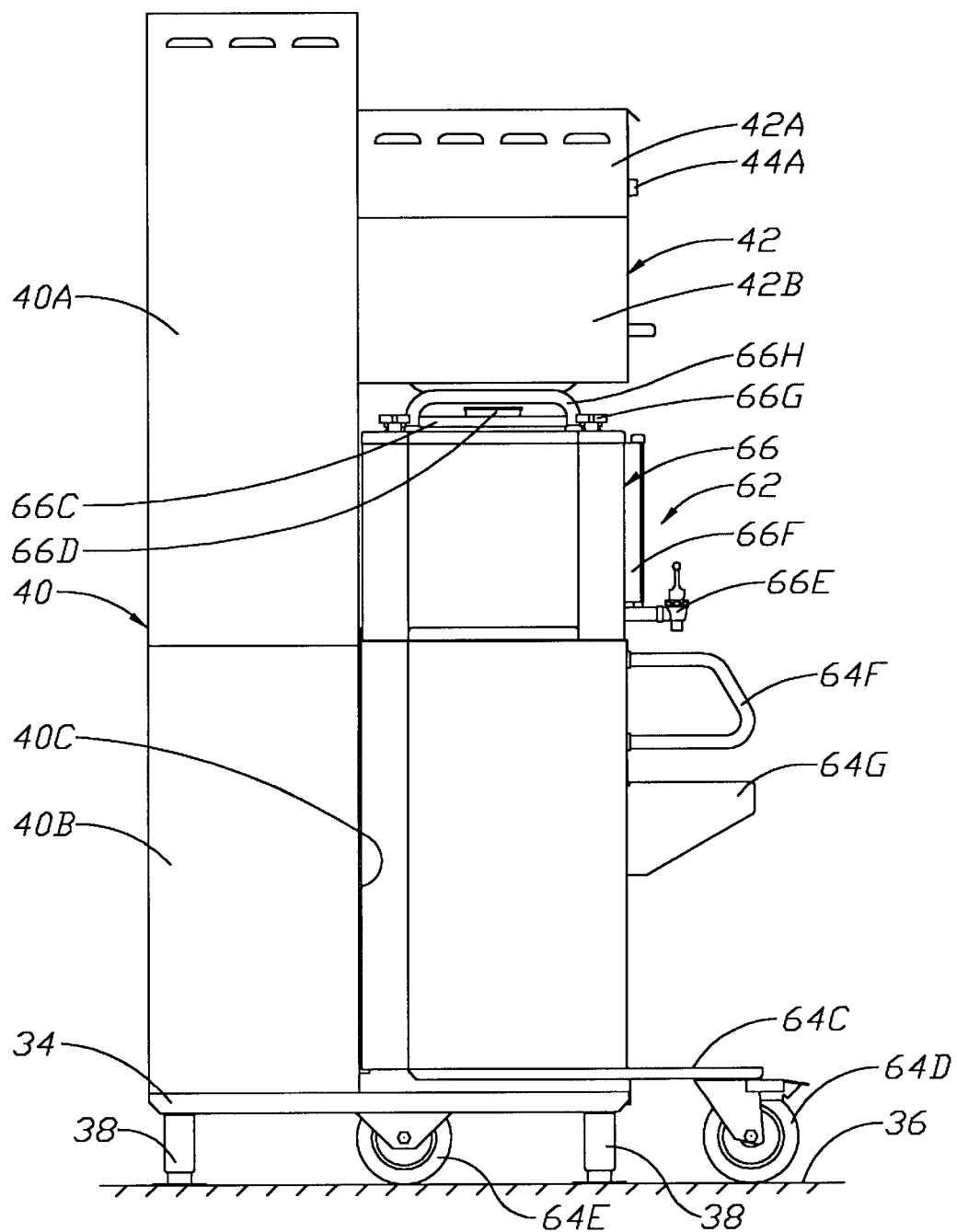
FIG. 1B is a side elevational view of the double brewer of FIG. 1A together with the transportable double brewer dispenser of FIG. 1A.

Referring now to FIGS. 1A, 1B and 1C, a preferred embodiment of a mobile twin brewer system 30 is seen which includes a pair of substantially identical brewers 30A and 30B symmetrically mounted in side-by-side symmetrical relationship within a single rectilinear housing, or frame, 32. The rectilinear housing includes a base 34 supported above a floor 36 by five substantially identical legs 38, and the base 34 supports an elongate, upright aft housing section 40 with an upper aft housing portion 40A and a lower aft housing portion 40B.

The upper aft housing portion 40A, in turn, supports a forward housing section 42 in cantilever relationship suspended at a preselected relatively elevated position above the floor 36, as best seen in FIG. 1B. The cantilevered forward housing section has an upper cantilevered housing portion 42A and a lower cantilevered housing portion 42B. Mounted to the forward face of the upper cantilevered housing portion are two control panels 44A and 44B of manually actuable control switches and associated status indicator lights respectively associated with the pair of brewers 30A and 30B as best seen in FIG. 1C. The switches and lights of control panels 44A and 44B are connected with a pair of associated electronic controllers (not shown) protectively contained within the upper cantilevered housing portion 42A.

Referring to control panel section 44A shown in FIG. 1C, each of the control panels 44A and 44B includes a power on/off switch 46 to control the application of AC power to the associated brewer, a "ready to brew" indicator light 48 to indicate when the associated brewer 30A or 30B is ready to start a brew, a brewer start switch 50, a "stop brew" switch 52 to manually stop the brew cycle of the associated brewer and a monostable "flush" switch 54 for controlling a flushing operation of the association brew system, all as described in more detail below.

Referring again to FIG. 1A, the lower cantilevered housing portion 42B supports in cantilevered suspended relationship with the floor 36, a brew/by-pass hot water distributor assembly 56 and a brew basket assembly 58 for each of the brewers 30A and 30B. During a brewing cycle, hot water from a separate hot water dispenser tank for each of the brewers 30A and 30B (not shown) mounted within the aft housing section 40 is allowed to flow downwardly by passing or flowing through ground coffee contained within the brew basket assembly 58 and out through a beverage outlet 60 at the bottom of the brew basket assembly 58.

In keeping with an important aspect of the invention, the cantilever mounting of the forward housing section 42 positions the beverage outlet 60 at precisely the correct height above the floor and the correct forward distance from the front 40C of the aft housing section 40 to ensure correct depth alignment of a single inlet mobile dispenser assembly 62 with single one of the twin brewers, such as the right side brewer 30A shown in FIGS. 1A and 1B, or with a substantially larger dual inlet mobile dispenser assembly 64 shown in FIG. 1B. When the back 62A of the single inlet mobile dispenser assembly 62 and the back 64A, FIG. 3A. abuts against the front 40C of the aft housing section 40, the mobile dispenser assemblies 62 and 64 are correctly aligned depth-wise for receipt of brewed coffee directly into the mobile dispensers 62 and 64, respectively. Depth alignment is assisted and lateral alignment is ensured by means of leg guides 66A and 66B, on the left, and leg guides 68A and 68B, on the right, shown in FIG. 1A and described in greater detail below with respect to FIGS. 2A, 2B, 3A and 3B.

Still referring to FIGS. 1A and 1B, the single inlet mobile dispenser 62 includes a cart assembly 64 with a support platform 64A, supported, in turn, by a frame 64B, supported, in turn, by a base 64C. The base 64C is supported by a matched pair of forward, outer wheels 64D and a matched pair of aft, pivotally mounted inner steering wheels 64E, all assemble together in a generally trapezoidal relationship to support the single inlet mobile dispenser for rolling motion along the floor surface 36. Wheels are provided with brakes. Facilitating rolling the single inlet mobile dispenser 62 along the floor are a pair of handles 64F at the front of the card assembly 64. An adjustably mounted sink, or drip tray, 68 having substantial depth is mounted to the frame 64G by means of posts (not shown) which fit into a pair of horizontally aligned key hole slots 64H (only the unused pair shown).

The single inlet dispenser 66 has a thermally insulated container defined by side walls 66A with a closed bottom 66B resting upon the platform 64A and an open top with an insulated lid 66C to which is mounted a centrally located inlet funnel 66D for direct receipt of freshly brewed beverage from the beverage outlet 60 when in vertical alignment, as shown in FIG. 1B. After the dispenser 66 is filled with the desired amount of coffee as shown by a glass gage 66F, the dispenser assembly 62 is rolled out from beneath brewer 30B using handle 64F to any desired remote location for dispensing of coffee into individual cups or urns by means of a faucet 66E. After the dispenser 66 is filled, the inlet funnel 66D is closed with a removable vent cap 420 (not shown) to prevent spilling during transport and reducing heat loss. The insulated cover 66C is releasably locked in place by means of clamps screwed down tight by means of threaded knobs 66G secured down on threaded posts. The clamps are released and the cover 66C removed by means of a pair of handles 66H for access to the interior of the dispenser for cleaning. These handles 66H alternatively are used to lift the entire single inlet dispenser from off the platform 64A.

The twin brewer system 30 alternatively is used with a single inlet dispenser assembly 64, as shown in FIG. 1A, simultaneously with a pair of mobile single inlet dispenser assemblies 62 or is used in cooperation with a series of dispenser assemblies 62 which are necessarily filled by each brewer.

Figure 1D:
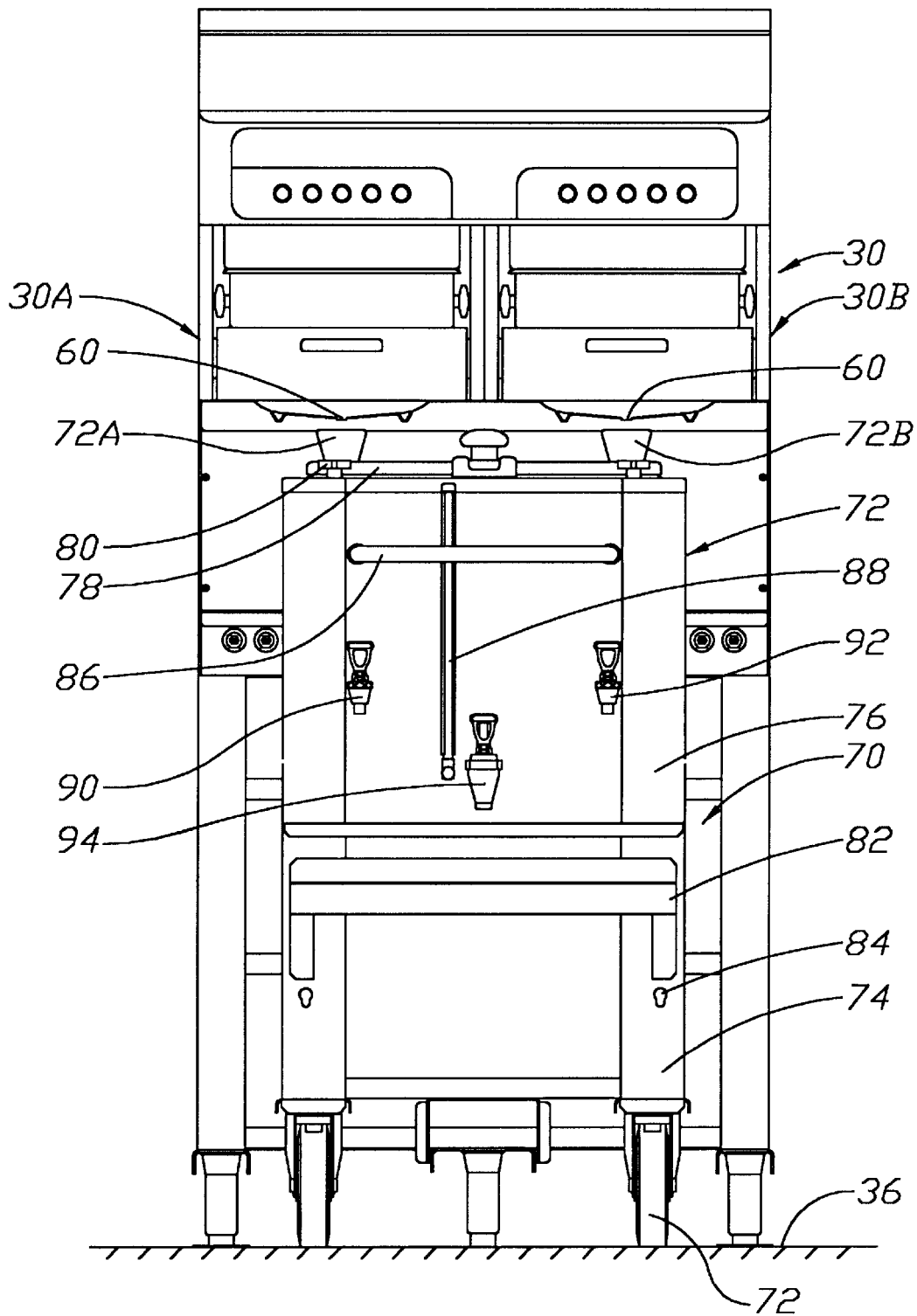
FIG. 1D is a front elevational view of the twin brewer assembly with a mobile duel inlet dispenser assembly for receipt of a brewed beverage from both brew heads.

In addition, as seen in FIG. 1D, the twin brewer assembly 30 is also adapted to cooperate with a mobile dual inlet dispenser assembly 70 similar to the mobile single inlet dispenser assembly 62 of FIGS. 1A and 1B. The dual inlet dispenser assembly 72 is permanently mounted on a cart 74 rollable across a floor 36 into a mating position with the twin brewer assembly 30. In the mating position, both of a pair of perimital inlet nozzles 72A and 72B are in vertical alignment with the beverage outlets 60 of both the left side brewer 30A and the right side brewer 30B to simultaneously directly brew freshly brewed coffee from both brewers into the one dispenser assembly 72. Like the mobile single inlet dispenser assembly 62, the dual inlet dispenser assembly 70 has a set of four wheels 72 supporting a frame, or housing, 74 which, in turn, supports the dual inlet dispenser 72. The dual inlet dispenser has an insulated body 76, an insulated lid 78 to which the inlet funnels 72A and 72B are mounted. The lid 78 is releasably clamped to close an open top of the body 76 by means of clamps tightened down with knobs 80. The mobile dual dispenser assembly 70 also has a sink 82 adjustably mounted to the fan 74 by means of key hole slots 84. The dual dispenser assembly 72 also has a handle 86, a level gage 88, a pair of aligned faucets 90 and 92 on opposite sides and a relatively lower centrally located faucet 94. The dual dispenser holds approximately 24 gallons of coffee and, thus, is not adapted for removal from support by the frame 74.

Depth alignment of the dual inlet funnels 72A with the beverage outlets 60 is achieved when the back of the dual inlet dispenser 70 is pressed against the front 40C of the housing section 40, same as with the single inlet dispenser assembly 62 as shown in FIG. 2A. Depth alignment is assisted. Lateral alignment is achieved by means of interior guide member 66A and 66A' of the shown brewer assembly 32 cooperating with guide means 68B and 68B' for the dispenser assembly, as well as described in greater detail with reference to FIGS. 2A, 2B, 3A and 3B.

Referring first to FIGS, 2A and 2B, each of the mobile single inlet dispensers 64 carriers adjacent the floor 36 a pair of elongate, symmetrically arranged male guide members 68B and 68B' which are guided by engagement with guide legs 66A and 66A' of the twin brewer assembly 30. The guide members have formed beveled sections 96 pointed inwardly toward each other to cause the guides upon engagement with the forward edges of guide members 66A and 66A' cam toward the center of the space 98 between guide members 66A and 66A'. Also, they have shoulders 98 extending perpendicularly outward from each other which engage the forward surface 100 of the guide members 66A and 66A' to block further insertion to assist in achieving proper depth alignment.

Figure 3A:
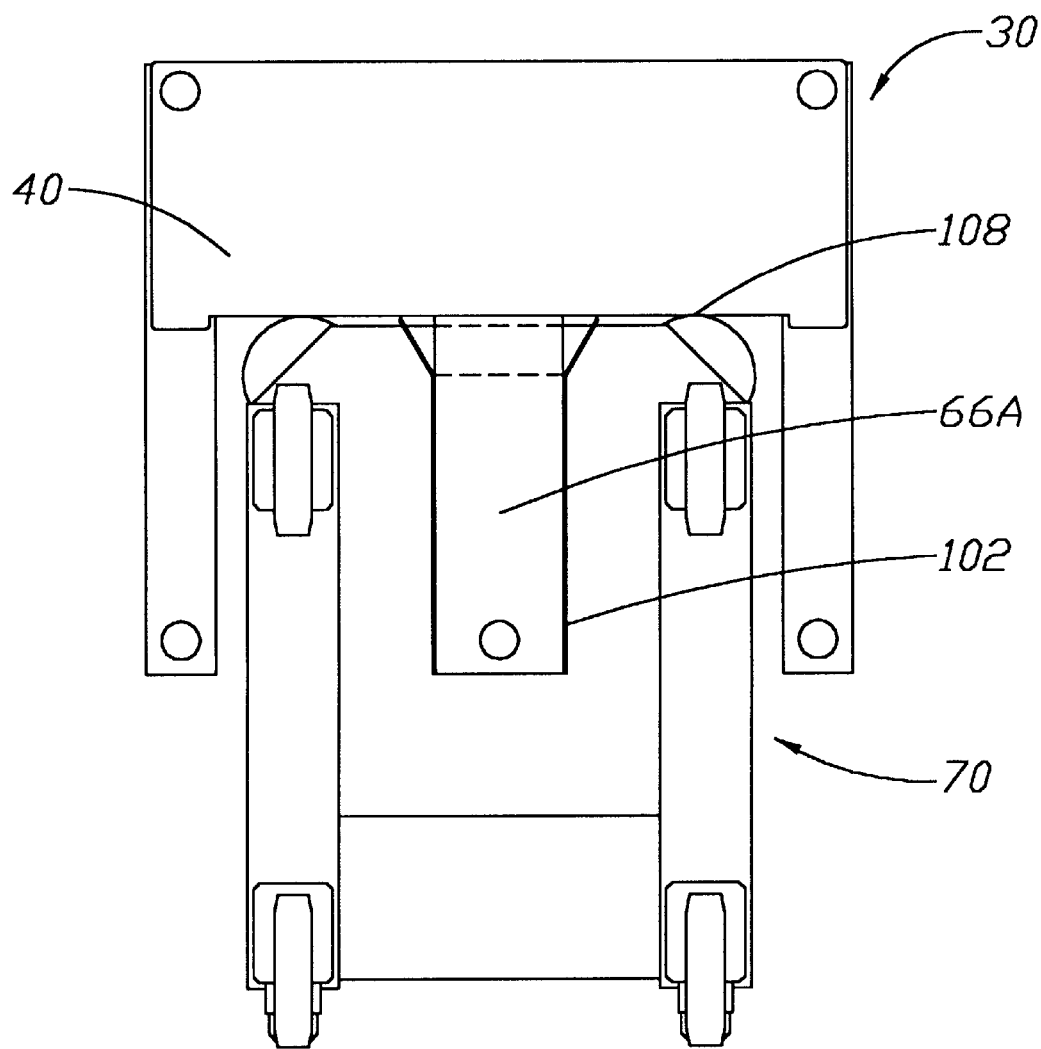
FIG. 3A is a bottom view of the twin brewer assembly of FIG. 1D showing the guide member of the mobile duel inlet cart engaged with the central guide member on the base of the twin brewer.
Figure 3B:
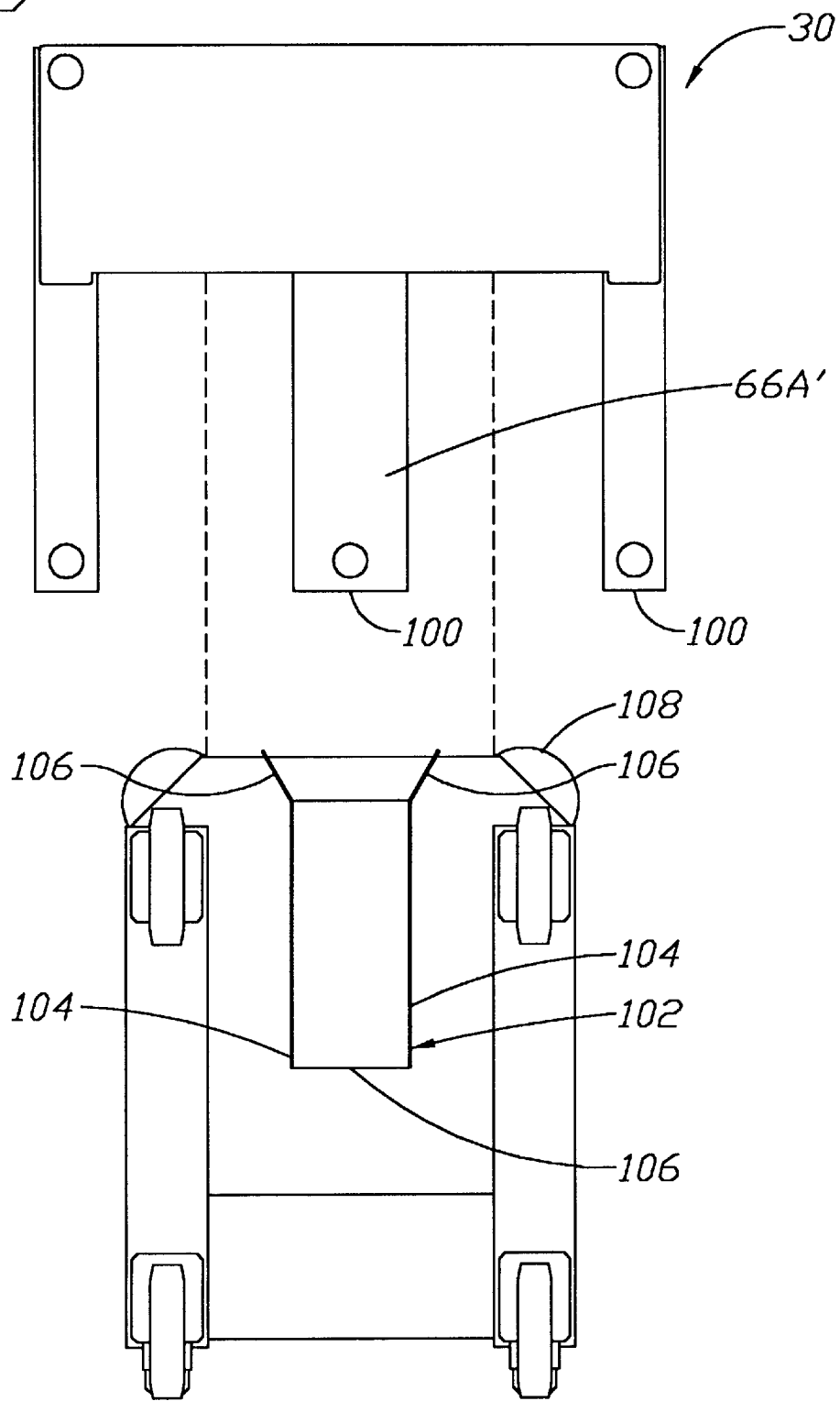
FIG. 3B is a bottom view of the twin brewer assembly of FIG. 3A showing the mobile duel inlet cart disengaged from the base of twin brewer.

As seen in FIGS. 3A and 3B, the same guide members 66A' which cooperates on opposite sides with the interior guide member 68B' of the mobile single inlet dispenser assemblies carts, functioning as female guide members, also function as a male guide member which cooperates with a generally rectilinear female guide member 102. Guide member 102 has a pair of parallel side walls 104 with beveled ends 106 for causing engagement with the end 100 of center or interior guide member 66A to facilitate receipt of the guide member 66A between parallel side walls 104. A stop member 106 extending between the side walls 104 engages the forward surface 100 of guide member 66A to block further forward movement to assist in correct depth alignment. In addition, when guide members 66A are fully inserted between guide member 102, rounded corners 108 abut against the forward wall of aft housing 40 to also assist in correct depth alignment.

Thus, in using the brewer system of FIGS. 1A–3B, an operator need not ever manually lift or move a dispenser into and out of cooperative relationship with the brewing system and, moreover, can directly brew into a large capacity dual inlet dispenser that would be too heavy for one person to lift. In addition, with the mobile dual inlet dispenser 72, both brewers can be used simultaneously to brew beverage directly into the dispenser. The same guide members on the twin brewer 30 are used to correctly align both mobile single inlet dispenser assemblies 62 and mobile double inlet dispenser 70. In using the twin brewer, an operator rolls the mobile dispenser into correct alignment with the beverage outlet 60 of one or both of the brewers 30A and 30B using the cooperating guide members, brews the coffee into the dispenser and when the desired amount has been received, removes (rolls) the dispenser from engagement with the brewer 30 to a service location, thereby making room for another mobile dispenser to be moved into engagement with the brewer.

Another embodiment of the twin brewer 30' is shown in FIGS. 4A and 4B which is substantially identical with the twin brewer 30 of FIGS. 1A–3B, except that instead of being equipped with the capacity of directly brewing beverage into a mobile single or double dispenser assembly, it is equipped with a pair of single inlet dispenser and a mechanism to facilitate manual removal of the single inlet dispenser from the brewer for manual transfer to a service cart or the like. In addition, the lower aft housing section 40B has been removed, and instead, the aft upper housing 40A' is supported on a base 34' and four legs 104 above a counter top 106.

Figure 4C:
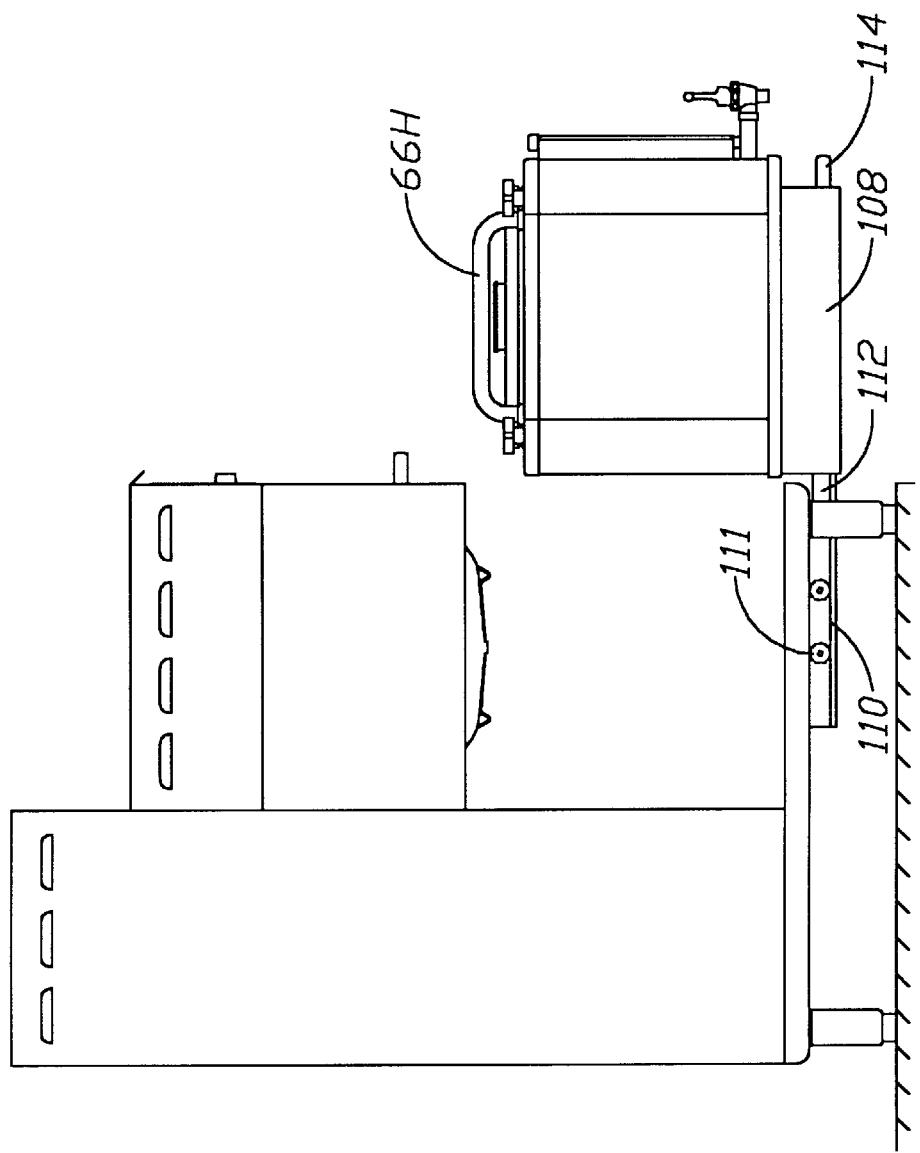
FIG. 4C is a side elevational view of the twin brewer assembly of FIG. 4A with the drawer in the extended open position for removal of the urn.

Instead of being supported on a platform 64A mounted on wheels, the single inlet dispenser 66 is mounted on a movably mounted dispenser shelf 108 which is slideably mounted on an elongate pair of parallel tracks 110 as best seen in FIG. 4C. Preferably, these tracks 110 have U-shaped channels in which wheels 111 are carried for ease of movement by a shelf mounting member 112 which is fixedly attached to the shelf 106. As seen in FIG. 4C, a handle 114 at the front of shelf 108 is accessible to manually pull the shelf 108 and the single dispenser carried by the shelf 108 from an operative position aligned beneath the beverage outlet for receipt of the brew as shown in FIG. 4B, to a loading/unloading position as shown in FIG. 4C in which a person is enabled to stand alongside the dispenser and other side gain better access to the handles 66H without having to lean over the top of the dispenser or slide the dispenser relative to the shelf 108. The shelf 108 is moved to the loading position to place an empty dispenser on the shelf 108 and is then slid or rolled backward to the operative brewer position. After the dispenser has been filled with the selected amount of brew, the shelf 108 and the loaded dispenser are then slid forward again to the forward load position. The dispenser is then manually lifted off the shelf 108 while in the load/unload position and then moved to another location directly or first moved onto a mobile service cart.

As seen in FIG. 4D, the service cart is preferably the same as the service cart assembly 64 of the mobile dispenser 62. In addition, the dispenser preferably has a boss 116 with a threaded hole within which a threaded bolt 118 carried by the service cart is matingly received to prevent the dispenser from falling off the cart. The threaded bolt is mounted for relative sliding movement along the slot 120 to facilitate alignment with the threaded hole of the bore 116.

Figure 4E:
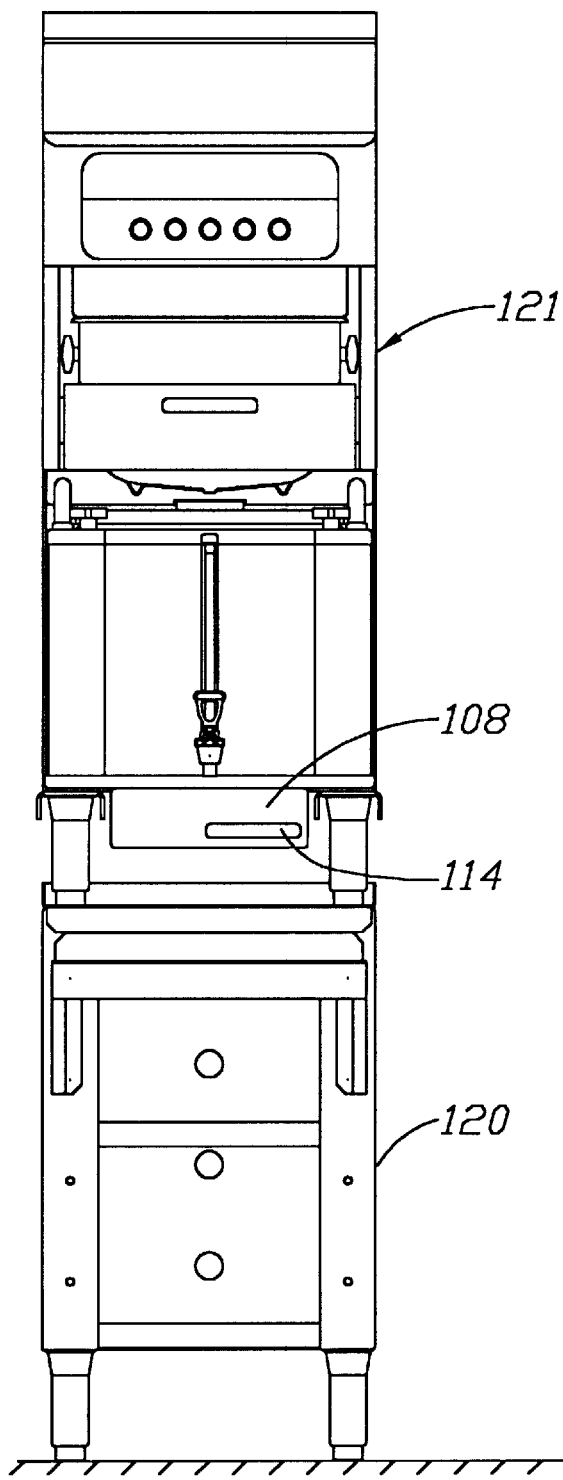
FIG. 4E is a front elevational view of a preferred embodiment of the single brewer assembly of the present invention mounted to a stand.
Figure 4F:
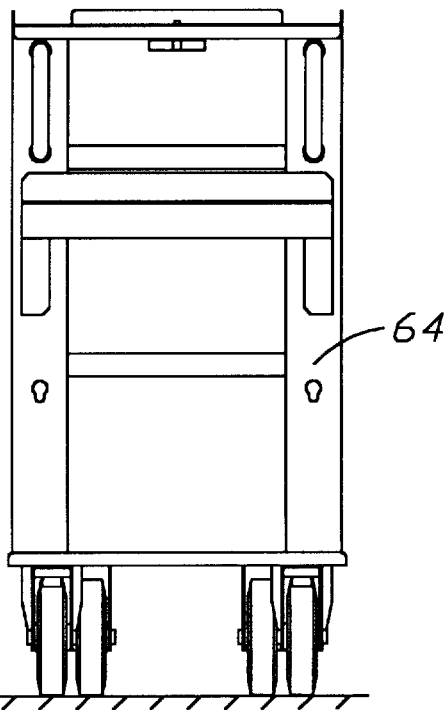
FIG. 4F is a front elevational view of a serving cart to which the removable urn of FIG. 4E is mountable.

As shown in FIGS. 4E, the brewer 30A or 30B of the twin brewer 30' are alternatively mounted alone in their own individual housing. Such single brewers are adapted for mounting on special stands 120 which support the shelf 108 at substantially the same height of the service cart assembly of FIG. 4D.

As soon in FIG. 5A, other versions of the mobile twin brewers 30 shown in FIG. 1D and the twin brewer 30' of FIGS. 4A and 4B. Transfer mobile twin brewer assemblies 120 and transfer stationary twin brewer assemblies 122, respectively, which are capable of transferring fresh brew from the associated brewer to one or more substantially identical holding tanks 124A and 124B. As shown in FIG. 5B, the control panels 126A and 126B of these transfer brewers have control switches additional to the control panels 44A and 44B associated with the transfer capability. In addition to the power switch 46, the ready indicator 48, the brew start switch 50, the stop switch 52 and the flush switch 54', each of the control panels have two transfer switches: an automatic transfer on/off bistable switch 128 and a monostable manual transfer control switch 130 that must be manually held in an on state in order to effect transfer.

Each of the transfer brewers 120 and 122 have a pump (seen in FIG. 7A), one or more transfer lines, or conduits, 132 and associated valve and connections to enable actuation of the pump and transfer of the freshly brewed beverage from the brewer to the first holding tank 124A with which it is connected. A line 134 with a manual control valve 136 selectively interconnects the storage tanks for transfer between the tank 124A and 124B before the first tank is filled. Otherwise, the first holding tank 124 must first be filled before there is overflow to fill the next holding tank 124B. When the automatic transfer switch 128 is on, the pump operates automatically to transfer the coffee to the holding tanks as explained below. On the other hand, transfer can be selectively controlled by manual actuation and holding of the manual hold transfer switch 130.

The flush switch 54' in combination with the transfer switch is used to flush the pump (not shown), the transfer lines 132 and the holding tanks 124A and 124B.

Referring again to FIG. 5B, the third additional switch is an emergency stop switch, or power assist break/reset, 138. When this bistable switch 138 is pushed in, all brew and transfer functions cease and power to the brewer is disconnected. When the switch 138 is pulled out to reset the brewer and re-establish power, the controller required the brew cycle to be restarted and the original brew cycle in process when the emergency stop switch was actuated will not be allowed to continue.

Referring again to FIG. 5A, each of the holding tanks holds approximately 60 gallons of brew, has an upper faucet 140 at an upper level which is preferably used when the tank is filled to reduce head pressure and a lower faucet 142 at a relatively lower level and when the level of the brew is below the level of the higher faucet 140. The holding tanks also each have an insulated body, a removable insulated cover 144 with handles 146, a head gage 148 and are supported on stands 150 substantial identical for mounting the stationary twin brewer 122. The first tank 124A is directly connected to each of the brewers 120 and 122 by their own line 132. Although only two holding tanks 124A and 124B are shown, each brew unit has capacity for connection with at least one tank and each tank has capacity for inlet connection with multiple brewers and outlet connection with an inlet of another tank. Accordingly, any number of tanks can be connected in series.

Figure 6B:
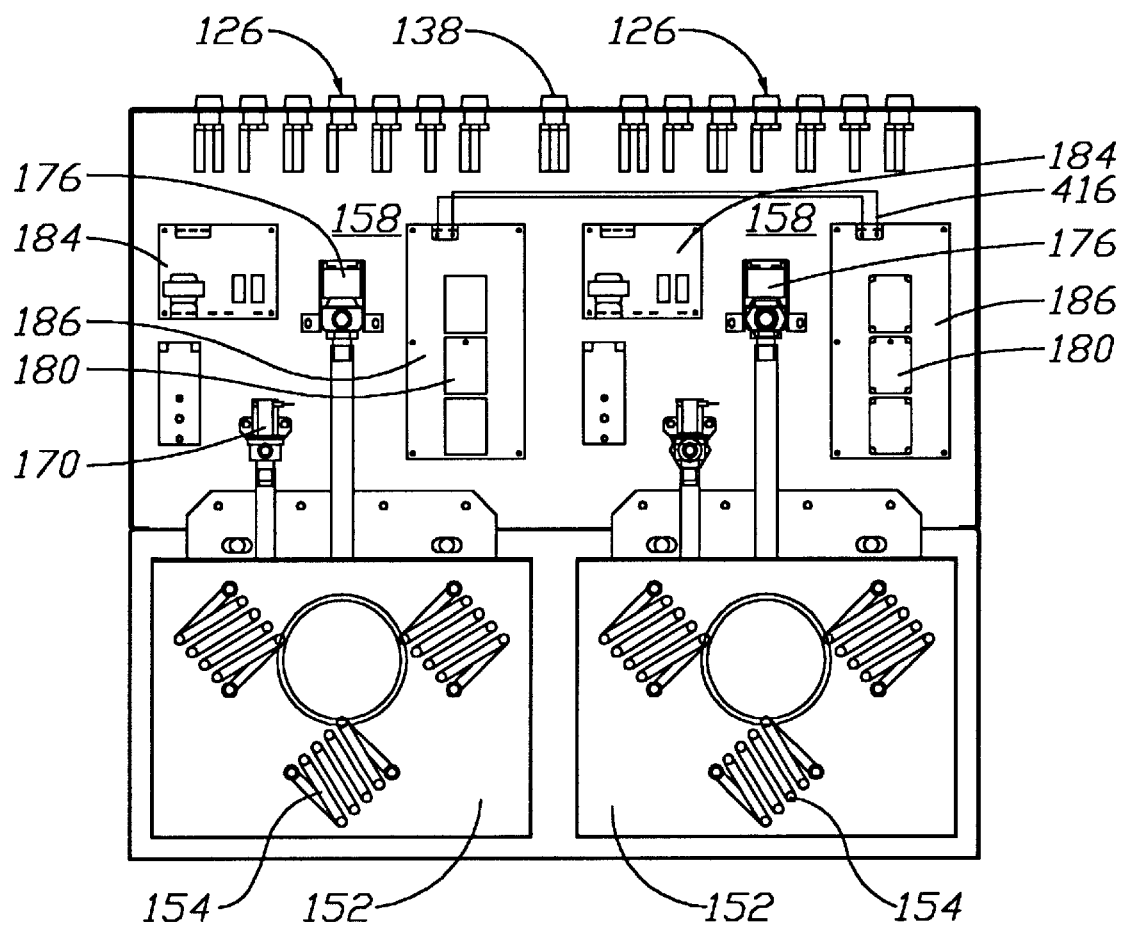
FIG. 6B is a top view of the single brewer of FIG. 4E showing the other logic control components.

Referring to FIGS. 6A and 6B, an important feature of the twin brewer system is that each of the two brewers is self-contained and is capable of operating individually of the other brewer should the other brew cease to function properly. At the same time, the twin brewers operate in a coordinated fashion to achieve speed of production equal or better than that of known nonindependent systems which require a high level of electrical service, such as 220 VAC, with a lower level of service more commonly accessible, such as standard 110 VAC electrical service. Referring to FIG. 6A, this is made possible, as will be explained in detail below because each brewer, brewers 30A and 30B, is provided with its own separate hot water tank 152, with its own individual electrical heating element 154, with its own power supply, with its own water supply control to and from tank 156 and its own controller 158. There is a single water connection and electrical power connection for the twin brewer but the connections immediately branch off to the two separate brewers.

Because of the separate water tanks, dispensing a fixed amount of brewing levels 160 and 162 defined by the ends of level sensor 164 and the level of brew 166, from the hottest part of the tank adjacent the top and connection of all electrical power to the heating elements 154 of only one hot water tank 152 at a time, a relatively rapid heating of the hot water in tank 152 through use of standard 120 VAC power instead of 220 VAC is achieved.

Still referring to FIG. 6A, each brewer is also seen to contain a second level sensor 168 for detecting when the water is beneath the normal lowest level during operation such as when the tank is first being filled. Each of the brewers also contain a by-pass valve 170 which provides hot water from the tank 152 to a by-pass location above the annular trough 172 of a brew water distributor 174 for a selected time period at the beginning of each brew cycle or during a flush operation under control of controller 158. A brew water dispenser valve 176 selectively passes hot water to a brew water dispenser location suitably located above a central bowl 178 of the distributor 174. The bowl 178 is isolated from the annular, or doughnut shaped, distributor by-pass trough 172. Water from the trough 172 drops through an annular gap 180 between the perimeter of a brew basket 182 and a filter 184 holding the coffee 186 in a central location beneath the bowl 178 to by pass the filer 184. Both the by-pass water from valve 170 and the brew water from valve 176 and bowl 178 passing through the coffee 186 exit through the brew outlet 60 and into the inlet funnel 66D. The duration of the time periods for the by-pass cycle and brew cycle are determined by plug in electrical times 188 of the controller 158. During a flush cycle, both valves 170 and 176 and opened simultaneously.

As illustrated in the top sectional view of the brewer of FIG. 6A, each of the controllers 158 share connection with the emergency stop and power reset switch 138 and have a communication line 182, they other side are entirely self contained with all their own components, including their own DC power supplies 184, control switch panels 126 (connections not shown) and circuit cards 186.

Figure 7A:
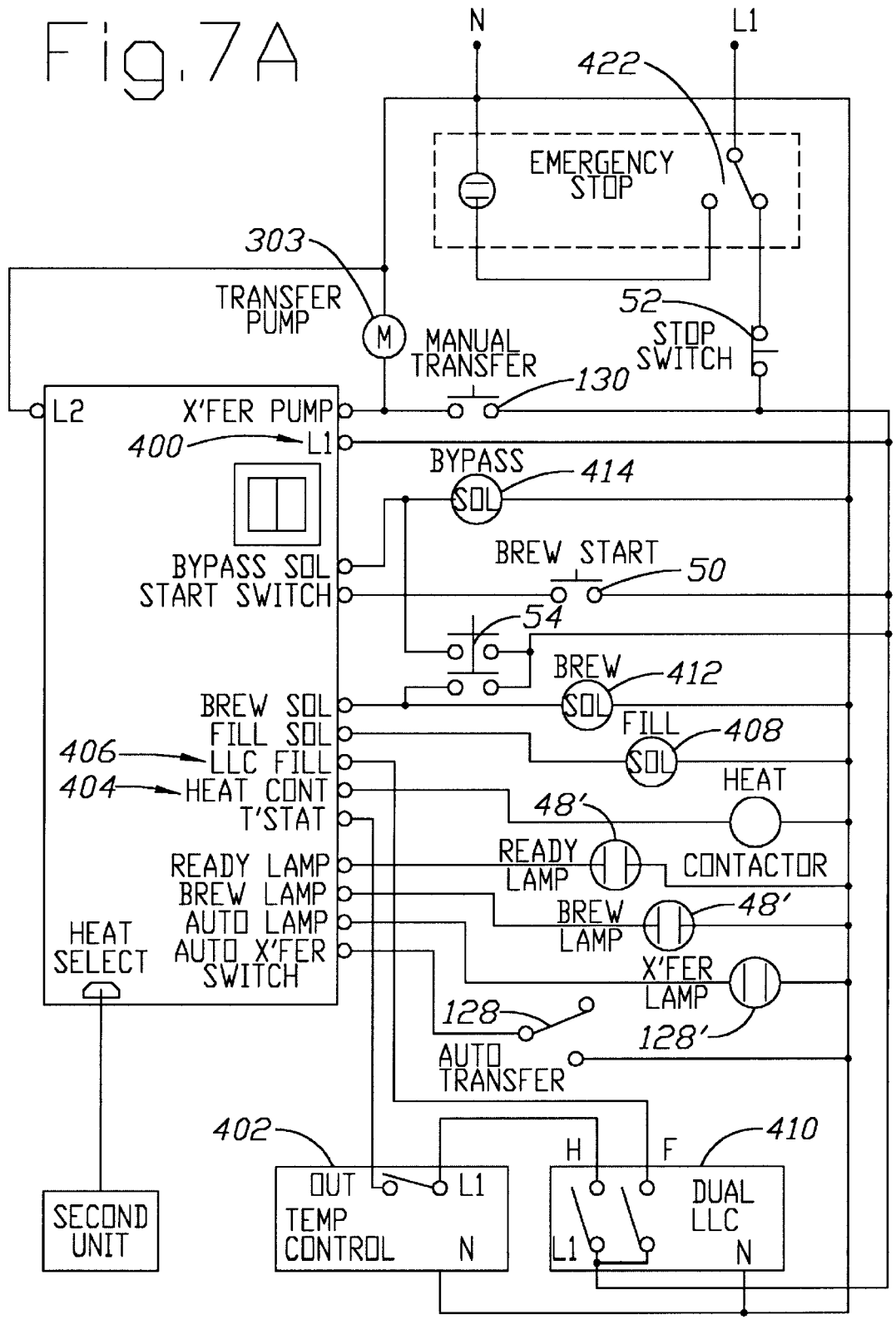
FIG. 7A is a schematic circuit diagram of the logic control circuit of the brewer of FIG. 4E in which a controller program is stored.
Figure 7B:
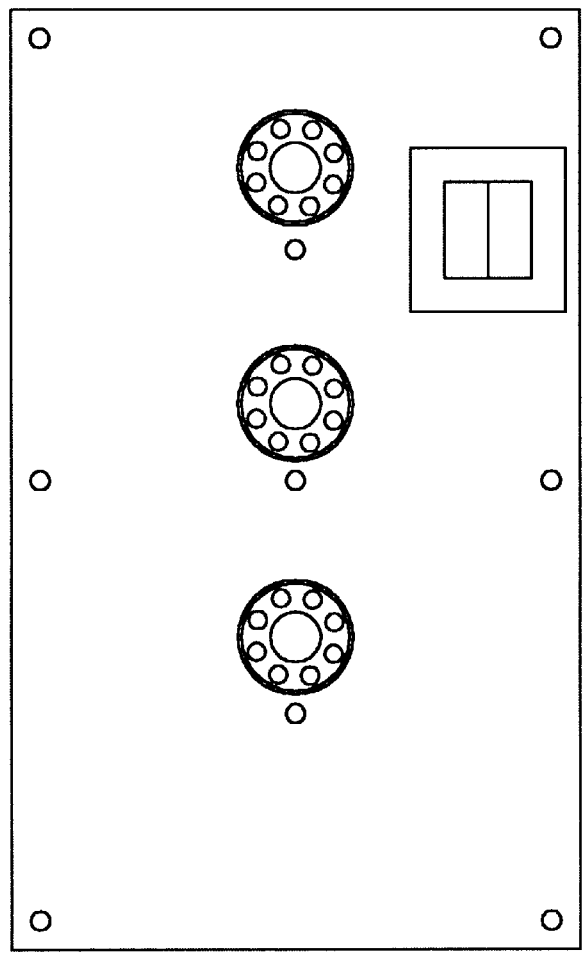
FIG. 7B is a plan view of a circuit board of the logic control circuit of FIG. 7A including sockets for removable receipt of solid state timers for setting the time period for the by-pass cycle, the brew cycle, and the flush cycle.
Figure 7C:
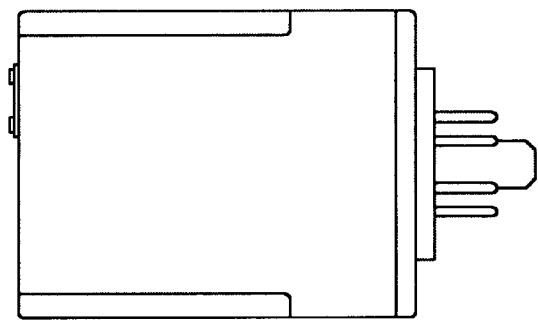
FIG. 7C is a side view of the timer module which is inserted into the sockets of FIG. 7B.
Figure 7D:
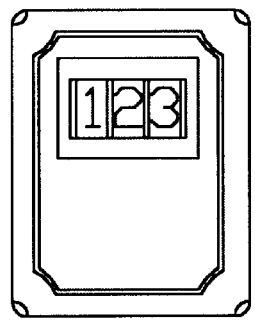
FIG. 7D is a top view of the timer module of FIG. 7C.

Referring to FIGS. 7A and 7B, the machine is ready to start a brew cycle when the water is at the correct temperature and the tank is full. If the water requires heating, L1 400 is switched to T'STAT terminal. When the control recognizes this, a relay contact 402 will close and switch L1 from the T'STAT terminal to the HEAT CONT 404 terminal which will energize the heater contactor. When the water is at the proper temperature, L1 400 is removed from the T'STATE input which will de-energize the heater contactor. The control will now open the relay contact 404 between the T-STAT terminal and the HEAT CONT terminal. When the external level control senses that water is required, L1 is switched to the LLC FILL terminal 406. L1 is then routed through a N.C. contact of TDR1 and out the FILL SOL terminal, energizing the fill solenoid 408. When the external level control does not require water, L1 will not be present on the LLC FILL terminal. If the heat is off and the fill is off the control will now turn on the READY lamp output. A brew cycle may now be started. The READY lamp will turn off again whenever the fill solenoid or heat is requested.

To start the brew cycle, press the BREW button 50. The control will latch L1 to TDR1-1 common relay terminal 410. The control will then recognize this via internal circuitry connected to the TDR1-4 N.C. contact. The control will now energize K2 switching L1 to TDR1-2 and TDR2-2 power input energizing the TDR1 and TDR2 interval timers. The control will begin to flash the BREW lamp output 50'. TDR1 will now energize the brew solenoid and TDR2 will energize the bypass solenoid 414. The second set of contacts on TDR1 (TDR1-5 and TDR1-8) will open disable the LLC fill output from energizing the fill solenoid 408 during a brew cycle. When TDR times out, the fill solenoid 408 will de-energize and L1 will again be switched to TDR1-4 contact. The control will again recognize this and turn off the latching relay removing L1 from TDR1 and TDR2. The control will stop flashing the BREW lamp output 50'. The brew cycle is now complete. TDR2 would not be set longer than TDR1 since TDR1 sends the signal to the control that the cycle is over. At this time the connection will be re-established between the LLC fill output and the FILL SOL terminal allowing the vessel to be filled again. If a brew cycle is started before the READY light 48' is on, the control will turn on the power latch and turn on the BREW lamp 50' solid but will not enable the interval timers until the water is up to temperature and the tank if full.

Upon the completion of the brew cycle, if the AUTO TRANSFER switch 128 is closed, the control will begin the transfer cycle. At this time L1 will be switched to the TDR3-2 power input terminal starting the TDR3 interval cycle. L1 400 will be switched to the transfer pump terminal energizing the transfer pump 303. Internal circuitry in the control will recognize that the transfer pump 303 is energized and not allow a new brew cycle to take place. During the transfer cycle, the control will flash the AUTO lamp 128'. Upon completion of the transfer cycle, the transfer pump will de-energize, the AUTO lamp will stop flashing and the control will now allow a new brew cycle to begin when the water is at the proper temperature.

AUTO TRANSFER

When the Auto Transfer switch 128 is closed, the control automatically performs the transfer function following a brew cycle. When the Auto Transfer 128 switch is not closed, the transfer must be performed manually. The control can also recognize the manual transfer and will not allow brew cycle to take place when the transfer pump is energized. The AUTO lamp 128' output will be on solid if the transfer switch is closed and the transfer function is not taking place. The AUTO lamp 128' will flash any time the transfer pump 303 is energized.

LINKED OPERATION

The brew cycle in the linked mode of operation is as previously described with the following exceptions.

The controls are connected with a communication cable 416 as seen in FIG. 6B. In this mode of operation only one unit at a time will be allowed to turn on the Heater contactor 404. The controls continually monitor the integrity of the cable. Should the cable 416 open a line, both controls will cease operation and flash three lamp outputs to signal a communication link error. Power must be removed and the condition corrected. Also in this mode of operation the communications circuitry can determine if power has been removed from the other control allowing the unit which is powered-up to have the heat whenever it is required as in the stand-alone mode of operation. When the second unit is powered-up again, the linked mode operation will resume as previously described.

Figure 8A:
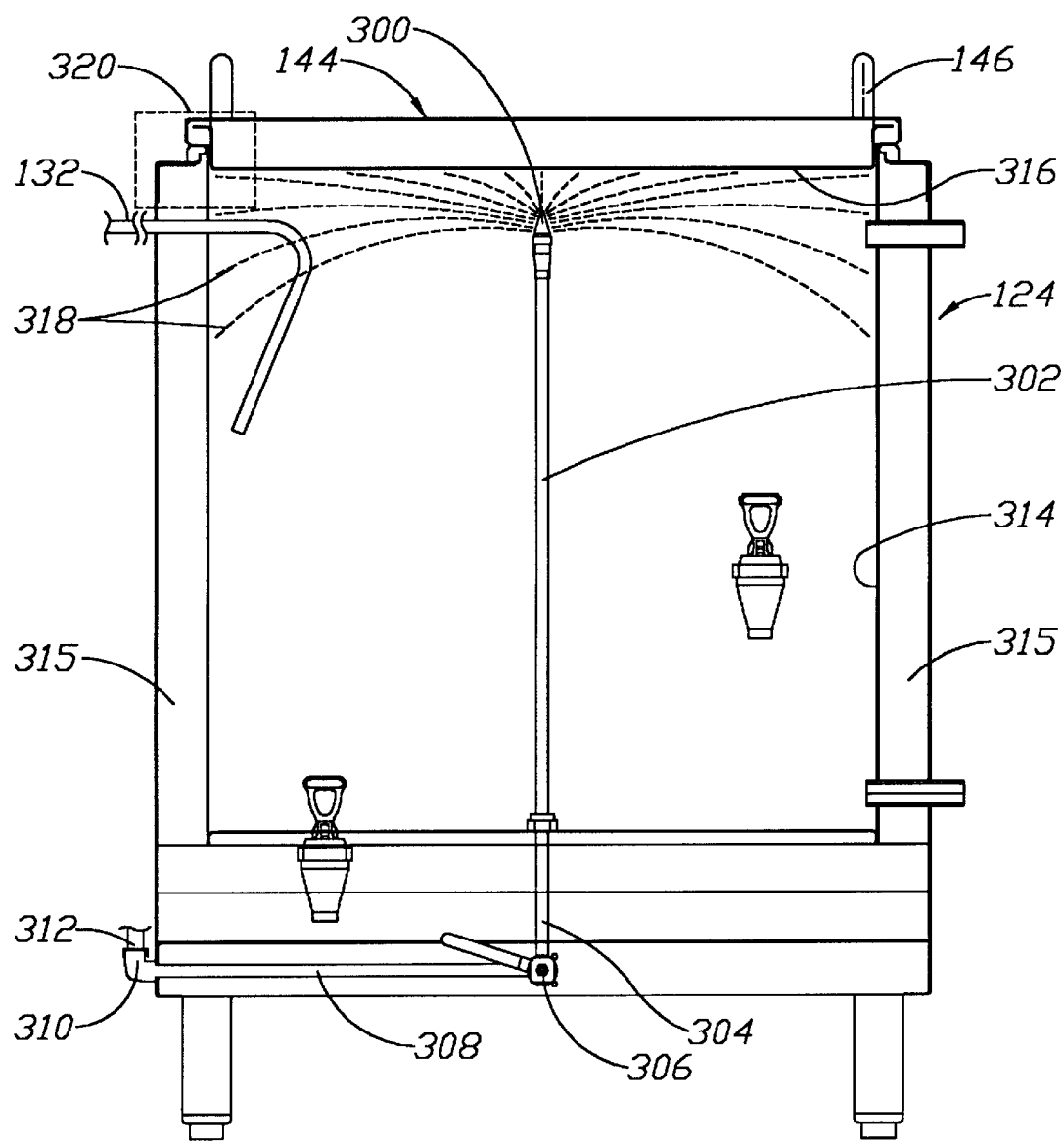
FIG. 8A is an enlarged sectional front elevational view of the storage tank of FIG. 5A showing a spray nozzle head assembly used to flush down the top and sides of the storage tank.
Figure 8B:
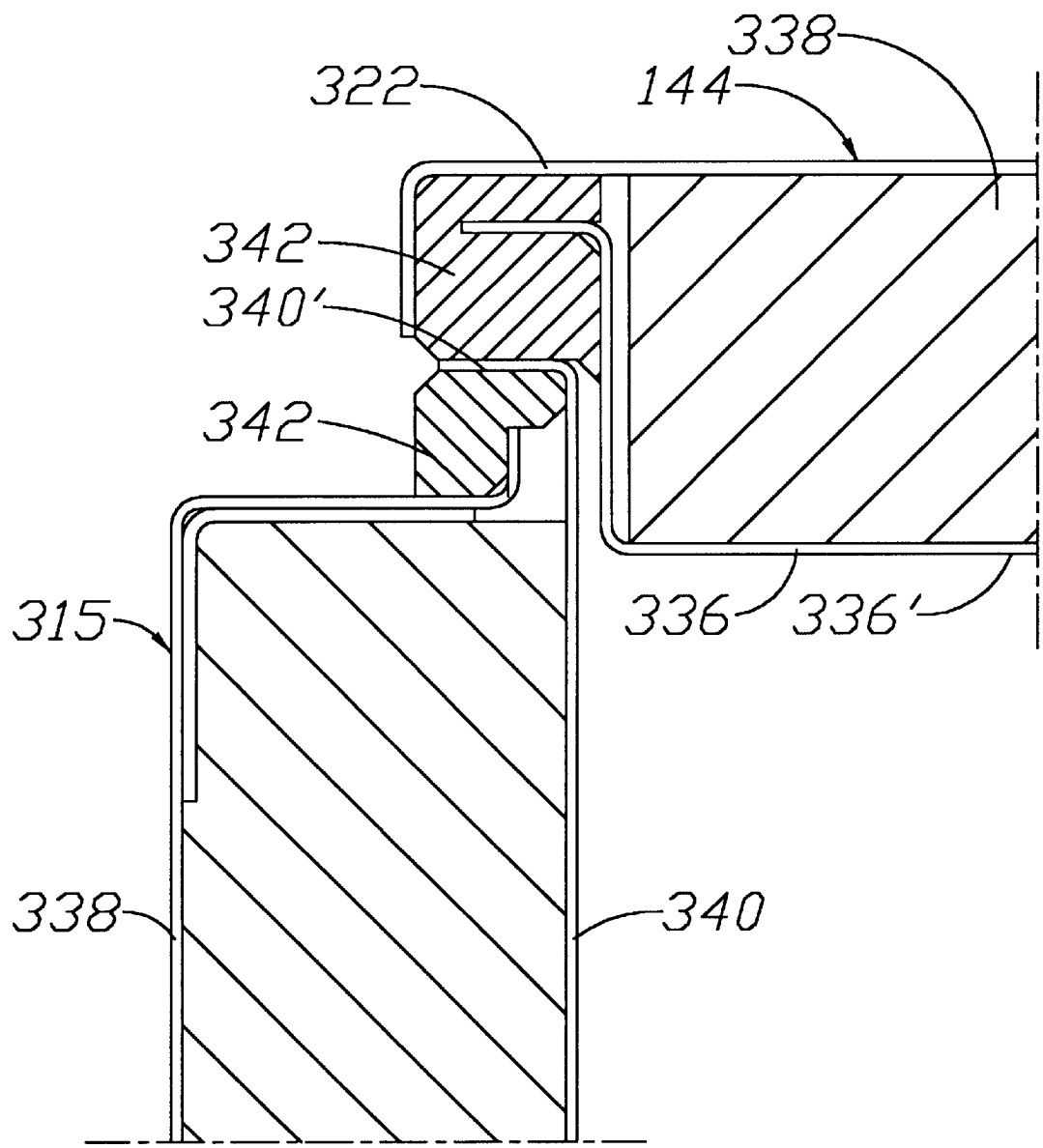
FIG. 8B is an enlarged cross sectional elevational front view of a portion of the holding tank of FIG. 8A adjacent the juncture of the lid and the side walls.

Referring now to FIG. 8A and 8B, another advantageous feature of the holding tank 124, identical to holding tanks 124A and 124B of FIG. 5A, is the provision of a flushing mechanism which includes a spray nozzle 300 centrally mounted at the end of a centrally located upstanding conduit 302 which, in turn, is connectable to a pump 303, FIG. 7A, of the brewer through a conduit 304, manually controlled valve 306, conduit 308 and connector 310 through a detachable flexible hose 312. First, move the transfer hose 418 as seen in FIG. 4A from the parking position on the side of the brew head you want to transfer. Insert it into the top of the sight glass 66F on the dispenser after removing the vent cap 420. Second, select the Transfer, Automatic, ON push button above the brew head you wish to transfer to holding tank activating pump 303 to pump hot water form the urn through conduit 132 and into the holding tank 124. Hot water is pumped through the hose 312 when it is desired to flush the interior of the holding tank 124 with hot water from the brewer to rinse clean and sanitize the interior surfaces 314 of the walls 315 and the interior surface 316 of the removable lid 144. As indicated by the dotted lines 318 representing the hot water flow during a flush cycle, the cleansing hot water is caused to impinge on the interior surface 316 of the lid 144 at acute angles to cascade across and down these surfaces with a high velocity spray to obtain a dynamic cleansing action superior to merely soaking the surfaces as done in the past.

Referring to FIG. 8B, which is an enlarged cross sectional view of a portion 320 of the holding tank 124 adjacent the juncture of the lid 144 and the side walls 315, another advantage of the brewing system of the present invention is that the side walls 315 and the lid 144 have a double wall construction with insulating material sandwiched between the double walls. The lid 144 has a top wall 322 and a bottom wall 336 with solid insulation 338. The double wall 315 has an outer wall, or jacket, 336 and an inner wall, or liner, 340 between which is sandwiched insulation layer 340 which is the same solid insulation material as in the lid 144, preferably TRYMER. In addition, thermal insulation is provided between the interior metal surface of the lid and the side walls of the tank. The top, or exterior, wall 322 of the lid 144 is isolated from the interior wall 336 and secured thereto around the perimeter by means of a strip 342 of an insulating cement-like or other insulating material, preferably TRYMER. This insulating strip is in addition to isolating the wall 322 from wall 336 also isolates the wall 336 from the end 340' of interior side wall 340. Another thermally isolating strip 342 of insulating material, preferably TRYMER, secures together and thermally isolates the outer wall 338 and the liner wall, or liner, 340. No interior metal, which is highly thermally conductive, is in contact with any outer metal and the internal surface 336' has a highly reflective surface to reflect heat downward for optimum thermal insulation of the coffee.

Each of the dispensers, both single inlet and double inlet, have the same thermal insulation and isolation construction as shown in FIG. 8B. Due in part to this thermal insulation of all dispenser, etc. the need to provide additional heat to the dispensers or tank is eliminated and less electrical power construction is required for operation.

Figure 8C:
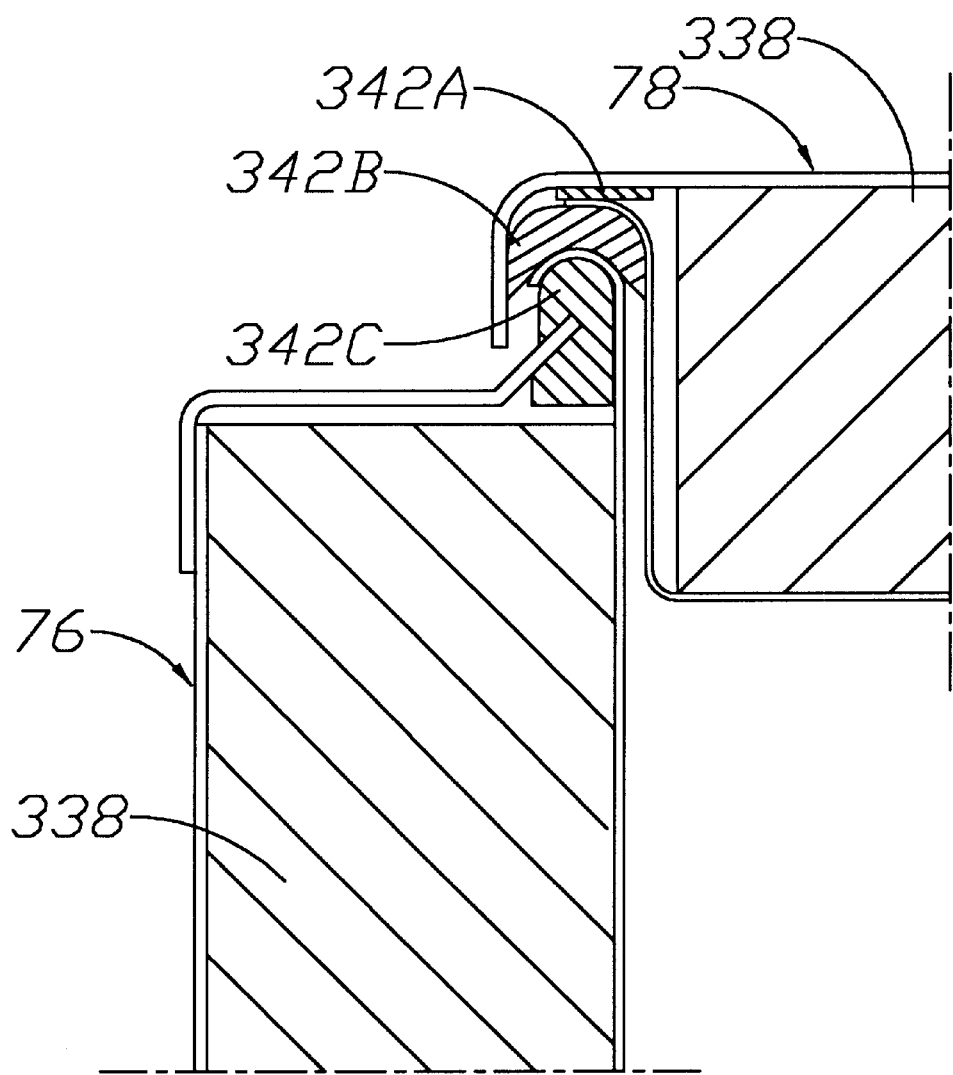
FIG. 8C is an enlarged cross sectional side elevational view of a portion of the urn of FIG. 6A adjacent the juncture of the lid and the side wall.

The mobile dual inlet dispenser and mobile single inlet dispenser similarly have double walled insulated construction. As seen in FIG. 8C, the cover 78 and side walls 76 have a double walled construction with insulation 338 and thermal lid isolation lid members 342A and 342B and side wall thermal isolation member 342C.

Figure 9A:
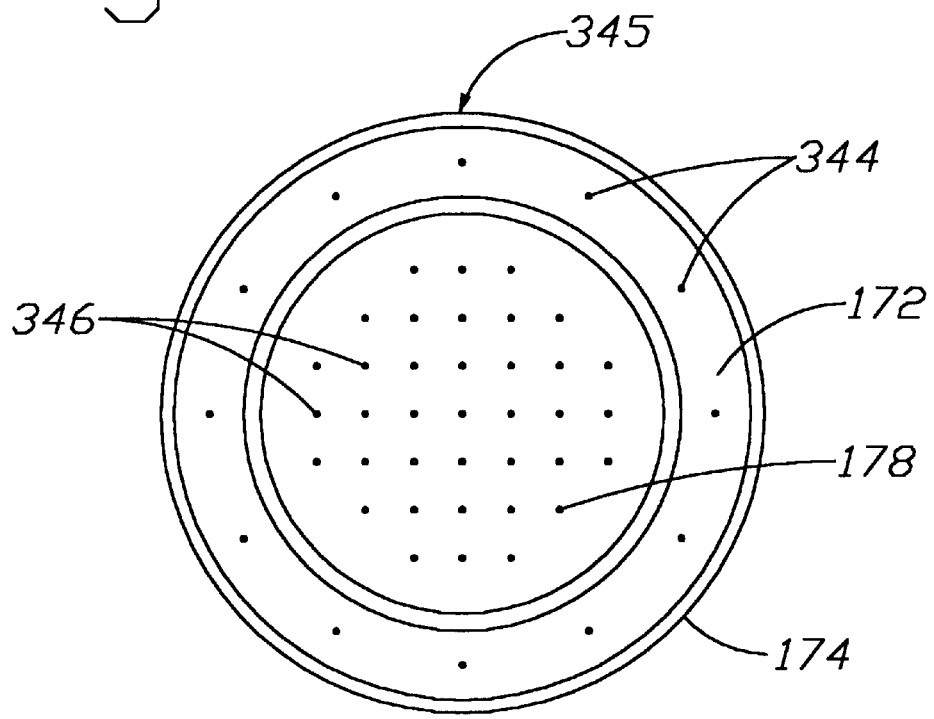
FIG. 9A is a plan view of the spray disk of the brewer of in the preferred embodiment of FIG. 1A.
Figure 9B:
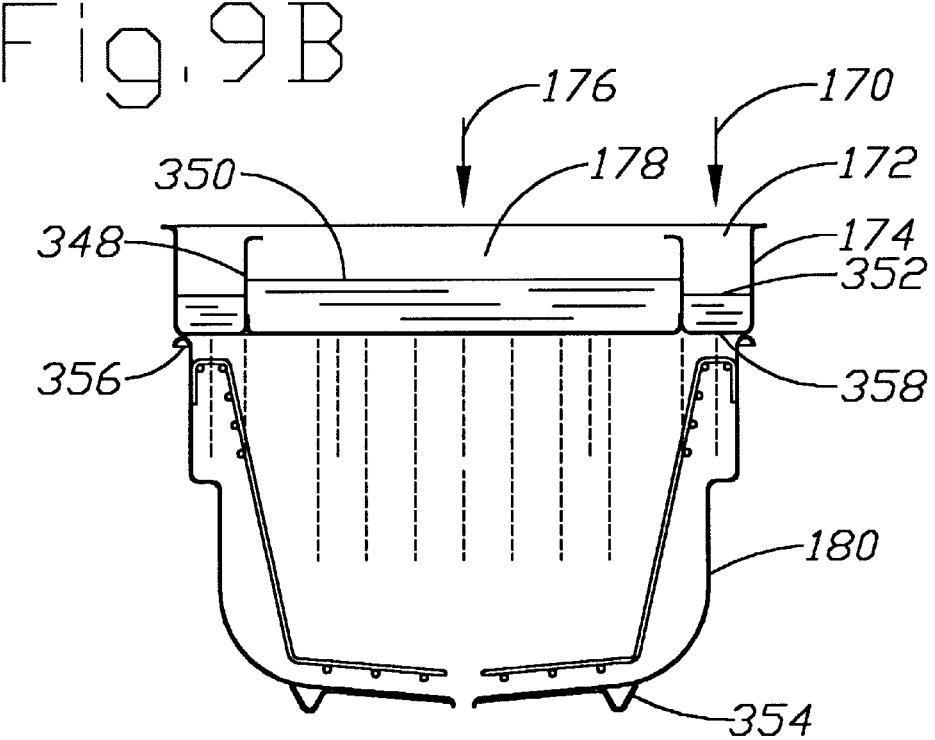
FIG. 9B is a sectional side elevational view of the brew basket assembly of FIG. 6A.

Referring now to FIG. 9A and 9B, showing the spray disk 345 in FIG. 9A having a central bowl 178 which receives hot water from the brew valve 176 and separates the brew water into large number of separate showers through a matrix of holes 346 to covet the entire bed of coffee. The bypass valve 170 passes hot water into the bypass trough where hot water is diverted around the coffee bed and passes through a matrix of drainage holes 344 into the brew basket and mixes at the bottom of the brew basket with the brewed coffee.

Referring to FIG. 9B specifically, spray disk 345 has an annular wall 348 that separates the trough 172 from the bowl 178 such that the levels 350 and 352 of accumulated water are not necessarily the same and the by-pass period has ended and the brew water begun to pass through the coffee 186. The brew basket has a base 354 and is snugly fitted at its top 356 against the bottom 358 of the by-pass/brew water dispenser 174 to block the upward escape of heat and steam from within the brew basket 180.

Figure 10B:
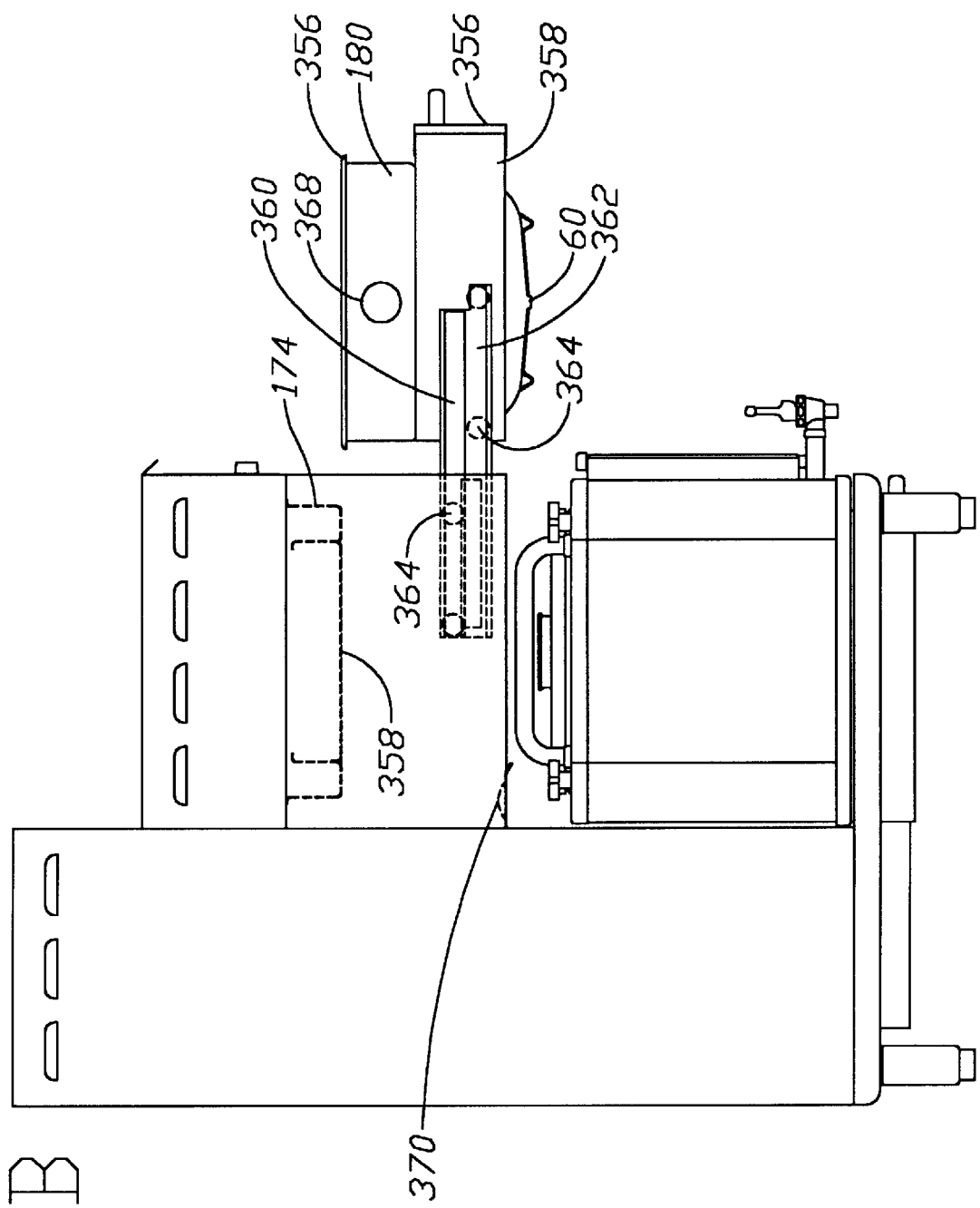
FIG. 10B is a sectional side view similar to that of FIG. 10A but in which the brew basket adjacent to its aligned position before it is carried into sealed engagement with the by-pass/dispenser assembly.

This sealing engagement is achieved despite the brew basket being mounted for sliding movement into and out of engagement with the distributor by means of a movably mounted brew basket mounting assembly 356 shown in FIG. 10A, 10B and 10C. The brew basket 180 is removably mounted within a drawer-like frame 358 within which the brew basket is nestled and secured against downward or lateral movement relative to the frame 358. The frame 358, in turn, is mounted for gliding translational movement by means of opposed sets of slideably engaged track 360 and 362 cooperating with rollers 364 which operate like file drawer slides. Pulling on the handle 366, an operator can slide the brew basket mounting assembly from the operative position shown in FIG. 10A to the position shown in FIG. 10B at which the brew basket 180 can be easily lifted vertically out of the frame 358 using handles 368. A new brew basket is then inserted and the drawer-like frame 356 is slid "closed". The frame is mounted at a slight angle relative to the bottom 358 of the distributor such that the leading edge of the top 356 of the brew basket is beneath the bottom 358, and the top 356 of the brew basket does not engage the bottom 358 until the frame has been almost fully inserted as shown in FIG. 10A. At that position a cam surface, schematically illustrated by cam number 370, lying in the path of the leading bottom edge of the frame causes the leading edge to rise to the level the top 356 and press it snugly against the bottom 358.

General reference should be made to all the drawing figures for the following discussion of the preferred use and detailed discussion of the portions of the twin brewer 30 of FIG. 1A and the single brewing system 121 of FIG. 4E. The twin brewer 30, as noted, is comprised of two single brewers 121 mounted within a single housing and with a line of communication or communications cord. Different steps are followed depending upon which brewer is being operated and whether it is mounted on a stand for use with the mobile dispensers or is only mounted on a counter.

FIG. 5B:

Push the power switch 46 to the ON position on each brew head to be used.

Each brew head has a computer 158, as seen in FIG. 6B, that will not allow a brew to start until the ready light 48 for that head turns on. However, a brew cycle can be selected at any time and the computer 158 will begin the cycle as soon as it is ready. The ready light 48 is on when the hot water tank connected to the brew head below the light is full of water, the water is up to the proper temperature, and the transfer, if selected, has finished. The transfer function does not delay the fill or heating functions. How long it takes for the ready light 48 to come on the first time each day and between brews depends on the electrical specifications issued when the brewer was ordered. Depending on the electrical power available, twin brewers 30 with the transfer option may be configured to allow only one brew head to heat up at a time. This delay in the heating process is important only during a cold start when the first brew head must come up to temperature before the second head can start to heat. After a cold start heat delay, the normal heat delay drops to only a few minutes. Depending on the electrical power and water temperature available, the normal heat delay may not be noticed by the operator.

Each dispenser 62 must be preheated before you brew coffee into them to make sure that the finished coffee will be as hot as possible. Any source of hot water is sufficient, even the brew head itself by using the Flush button 54. Fill the container to approximately half full on the sight glass with hot water and wait at least 10 minutes before draining and brewing into the dispenser.

Before making any coffee that will be transferred to a holding tank, make one full brew in each head, without coffee in the brew basket, and the Automatic transfer button 128 in the ON position. This water only brew will push hot water through all the coffee transfer hoses and components to the holding tank 144. The hot water both rinses and preheats these components. Be sure to turn on the rinse jet 300 in the holding tank 144 for several minutes for the same rinsing and preheating action used on the brewer. Finally, drain the holding tank before transferring coffee into it.

Open the drawer 356 holding the brew basket 180 very carefully and make sure there is not any hot coffee or grounds trapped inside. Remove the brew basket by first sliding the drawer 180 holding the basket 180 out of the brew head to its stop, as seen in FIG. 10C. Turn the brew basket by one handle 368 until you can reach both handles comfortably. Now grab both handles 368 and raise the basket up until it can clear the drawer 356 and remove it. If necessary, empty any old coffee grounds and clean the brew basket.

Place one paper filter in the brew basket. Into this paper filter place your ground coffee. Smooth the coffee in the filter until it is a uniform depth.

Pull the brew basket drawer out to its stop and place the brew basket into it. Rotate the brew basket and align one handle, left or right, with either front corner of the drawer.

This rotation keeps the brew basket handles from hitting the brewer body when the drawer is closed. Close the drawer. The drawer will be flush with the face of the brewer when in the fully closed/brew position. Twin brewer with transfer option mounted on Counter—proceed with steps 7 & 8, skip 9 & 10. Twin brewer with transfer option mounted on Stand (for serving carts only)—proceed to steps 9 & 10. Twin brewer with transfer option mounted on Split Stand (for serving carts & dispenser drawer)—proceed with steps 7 through 10.

Open drawers holding dispensers as seen in FIG. 4C very carefully to make sure there is not any hot coffee inside the dispenser. The transfer hose will have to be parked on the side of the brew head as seen in FIG. 4B before the dispenser drawer can be opened. Due to the weight of a dispenser with coffee inside, the dispenser must be drained before removal from the drawer by one person. Two people are required, one on each handle 66H, to carefully remove a full dispenser. The empty or full dispenser can be removed from the drawer for cleaning or transportation on the 6 gallon serving cart. Remove the dispenser by fully extending the drawer and lifting the dispenser 1 inch to clear the retaining lip on top of the drawer. If necessary, empty and or clean the dispenser before starting a fresh brew.

Extend the dispenser drawer to the full open position. Place a clean and empty dispenser inside the retaining lips on the drawer with the faucet facing out. Slide the drawer back into position in the brew head. The face of the dispenser will be flush with the face of the brew basket drawer when in the proper position.

When using the 6 gallon dispenser with cart, the 18 gallon mobil serving tank, and the 24 gallon mobil serving tank (18 gal. and 24 gal. mobile serving tanks are not usable with the split stand), always insure that the coffee liners are clean and empty.

CAUTION: ALWAYS INSPECT THE COFFEE SIGHT GAUGE AND THE COFFEE LINER TO MAKE SURE IT WILL HOLD THE NUMBER OF 6 GALLON BREWS YOU INTEND TO MAKE. The carts are parked under the brew head/heads with the operator steering handles and faucets facing out. Make sure that the front face of the coffee compartment is flush with the face of the brew basket drawer. When using the 6, 18 and 24 gallon carts, make sure that the brew basket opening is above the coffee dispenser cover opening/s.

CAUTION: ALWAYS SET BOTH PARKING BRAKES ON THE CART. The brakes should be set whenever the cart is not traveling and not under "hands on control" of the operator. NEVER park the cart under the brewer with out, A) insuring it is fully in the brew position, and B) setting the parking brakes. The brakes are set by pressing your foot on the paddle 37 as seen in FIG. 1B just above and to the rear of each steerable wheel 64E. When the brakes are set, a green button extends above this paddle. This green button is the brake release button. The brakes are released for traveling by pressing the green button with your foot. For a more detailed description on using the cart, refer to the appropriate carts operation manual.

Main control board and computer. The function of the main control board is to manage the timed functions, interface with the operators switches, remember the operator switch commands until they can carried out, system error detection, and the heater electrical power management in an integrated fashion. Each brew head has its own mail control board. The main control board carries the computer and the timers. Water temperature is controlled by the thermostat exclusively but the decision of when and which water tank in a twin brewer is allowed to heat is made by the main control board. Water level in the hot water tank/s is sensed by the liquid level control boards dedicated to each tank. The main control board monitors the LLC to insure the brewer is ready for the next brew cycle and inhibits the fill cycle during the brew cycle.

Fill system/liquid level control board. The function of the fill system is to control the incoming water so as to maintain sufficient amount of water in the brewer to complete a coffee brew cycle. Each brew head has a separate hot water tank and each tank has its own liquid level control board (LLC). The LLC controls the hot water tank water inlet valve and provides status reports to the main control board. The LLC uses 2 water sensing probes, one upper and one lower. The water inlet valve is opened until both probes are touching water. The lower probe is used to sense the presence of enough water in the tank to allow the heaters to come on without danger of burning the heaters out. When water is not felt by the lower probe, the LLC signals the main control board to prevent the heaters from coming on. The upper probe senses when the hot water tank is full to the brew level. When the upper probe senses water, it turns off the water inlet valve and signals the main control board to allow the next brew cycle. During the brew cycle, the water inlet valve is inhibited by the main control board from refilling the hot water tank. When water is taken from the hot water tank during the activation of the flush button, the LLC automatically refills the tank to the brew level again.

Heating system. The function of the heating system is to bring the temperature of the incoming water up to the proper degree to brew coffee. Each brew head has a separate hot water tank and each tank has its own thermostat. The thermostat is preset at the factory to 205 degrees F. The thermostat operates independently of other systems in the brewer but can be inhibited from heating in 3 ways. 1) if there is not enough water in the hot water tank to reach the lower water level probe, as in the first start up after installation or loss of water supply, heat is inhibited by the LLC via the main control board. 2) during the brew cycle, heat is inhibited by the main control board. 3) if the main control boards on two brew heads are connected by a communications cable, the main control board will allow only one set of heaters to draw from the incoming power source at a time. Which ever tank calls for heat first will lock out the other tank until it is done. The second tank will begin heating as soon as the first tank finishes. The thermostat will attempt to heat whenever the water falls below 204 degrees.

Dispense systems. The function of the dispense system is to deliver brew water to the brew basket to accomplish the brewing of coffee. The dispense system for each brew head is comprised of a brew valve and brew timer, a bypass valve and bypass timer, the spray disc and bypass donut, and the hot water tank. The main control board interfaces the operator brew start and brew stop buttons to these valves. The flush button opens these two valves directly and does not go through the main control board. The maximum water volume of 6 gallon is permanently set by the factory by way of the position of the brew and bypass valve at the 6 gallon level on the side of the hot water tank. The brew timer is set to hold the brew valve open until the 6 gallons has drained from the tank. On models with the transfer feature, the brew time is extended beyond what is required to finish a 6 gallon drain to delay the transfer pump cycle. This delay time (brew time extension) is set to allow the coffee transfer pump to begin at such a time as to allow the pump to finish shortly after dripping from the brew basket stops. These steps in the timing cycles allow AT brewers to be adjusted for maximum brew volume per hour. The main control board on all brewers inhibits the LLC from refilling the hot water tank until the brew and bypass valves close. This interaction of valve position and tank filling guarantees that the brew volume is both repeatable and predictable. The repeatable and predictable nature of the dispense system allows the timer to be set to allow any amount of brew temperature water up to 6 gallons to drain as well. The brew valve empties onto the spray disc. The spray disc separates the brew water into a large number of separate streams to shower the entire surface of the coffee bed in the brew basket with hot water. The bypass timer is set to hold the bypass valve open to achieve the desired percentage of bypass. The bypass valve empties the bypass water into the bypass donut where it is diverted around the coffee bed in the brew basket and into the coffee container along with the brewed coffee. From 0 to 40% of the brew water volume can be diverted in this manor. The main control board can delay the start of the brew cycle until the brewer is ready. I.E. proper temperature, full water tank, and the transfer if applicable is completed.

switches and what they do.

POWER (ON/OFF), extended push button, latching switch. The power on/off switch light is on with the switch in the on position. The switch turns the power on/off only to the brew head below the switch.

READY (TO BREW) light only. The ready light is on when the hot water tank connected to the brew head below the light is full of water, and when the water is up to the proper temperature. Each brew head on the brewer has a ready light. How long it takes for the ready light to come on the first time each day and between brews depends on the electrical specifications issued when the brewer was ordered. Depending on the electrical power available, twin brewer 30 and single brewer with the communications cord, may be configured to allow only one brew head to heat up at a time. This delay in the heating process is important only during a cold start when the first brew head must come up to temperature before the second head can start to heat. After a cold start heat delay, the normal heat delay drops to only a few minutes. Depending on the electrical power and water temperature available, the normal heat delay may not be noticed by the operator.

BREW (START), momentary push button. To speed the brew cycle, the Brew/Start can be selected before the brew head is ready. If the Brew/Start is selected before the brew head is ready, the Brew/Start light will turn on and remain on while waiting for the brew head to become ready. Two conditions must be met before the brew head will become ready and start the brew cycle. The tank must be full of water, and the water must be up to temperature. If the Brew/Start switch has already been pushed, the brew head will automatically start the brew cycle when these two conditions have been satisfied. The Brew/Start light will flash during the actual brew cycle.

STOP (BREW), momentary push button, no light. Stops and cancels the brew cycle on the brew head below the switch. The brew cycle can not be restarted from the point that it was stopped. If the brew cycle is canceled, you must start over.

FLUSH (HOLD), momentary push button, no light. Press and hold the flush button to open both the brew and bypass valves. Hot, brew temperature, water will flow into and through the brew basket and bypass donut into the dispenser for as long as this switch is pressed. This function is used primarily to rinse the brew head at the end of the operating cycle, shift, or day. Flush can also be used to preheat the brew head and dispensers before their first use of the day.

CAUTION: You can overfill the Dispenser if you hold this button in long enough.

10 AMP CIRCUIT BREAKER (PUSH TO RESET), protection for all of the left/right side brew head electrical components and function switches is provided by this breaker. Each brew head, left or right on twin brewers, has a separate breaker. Brew Timer. (front timer) Adjustable in one second increments The time required on this adjustment will need to be the minimum time required to clear the hot water tank of the complete 6 gallons needed for brewing. Brewers with the transfer option will require additional time (variable to each coffee, grind, weight, and spray disc selected) needed for drip out. The object of this additional time is to delay the transfer start time long enough to insure the transfer finish time is only slightly longer than the time needed for the brew basket to finish rapid dripping. The proper amount of time added to the minimum brew time insures that the transfer will be complete and that the dispenser will be empty for the next brew. If the additional time is longer than needed, the gallons per hour of coffee production will be reduced unnecessarily. Always inspect the dispenser to verify that a transfer was successful before starting another brew cycle. Remember that the transfer time is also adjustable and will effect this adjustment slightly.

Bypass Timer. (middle timer) Adjustable in one second increments.

1. Transfer Timer. (back timer) Not used on 71A & 72A
1. Brew water to coffee contact time.

Coffee contact time can be controlled by the size and total number of holes placed in the spray disc in the spray assembly.

1. Leveling

It is very important that the brewers, counters and stand be leveled with an accurate spirit level. Each brewer, counter, and stands have adjustable feet. Leveling must be done prior to bolting the feet down. If the foot mounting holes for bolting are not aligned with the holes provided when the brewer is level, a slightly back lean is preferred to any forward leaning of the brewer.

The twin brewer system 120 and 122 with the ability to transfer coffee to the holding tank 124A and 124, shown in FIG. 5A are operated in a manner in part the same and in part differently from the operation of the nontransfer single brewers 122 and twin brewer 30. The transfer brewer 120 (serving cart) and 122 are both referred to as a twin brewer and are handled somewhat differently as described below.

The steps to successfully prepare a freshly brewed beverage with the transfer option as seen in FIG. 5A can be appreciated as follows. Start by pushing the power switch 46 to the ON position on each brew head to be used.

Each brew head has a computer 158, as seen in FIG. 6B, that will not allow a brew to start until the ready light 48 for that head turns on. However, a brew cycle can be selected at any time and the computer 158 will begin the cycle as soon as it is ready. The ready light 48 is on when the hot water tank connected to the brew head below the light is full of water, the water is up to the proper temperature, and the transfer, if selected, has finished. The transfer function does not delay the fill or heating functions. How long it takes for the ready light 48 to come on the first time each day and between brews depends on the electrical specifications issued when the brewer was ordered. Depending on the electrical power available, twin brewers 30 with the transfer option may be configured to allow only one brew head to heat up at a time. This delay in the heating process is important only during a cold start when the first brew head must come up to temperature before the second head can start to heat. After a cold start heat delay, the normal heat delay drops to only a few minutes. Depending on the electrical power and water temperature available, the normal heat delay may not be noticed by the operator.

Each dispenser 62 must be preheated before you brew coffee into them to make sure that the finished coffee will be as hot as possible. Any source of hot water is sufficient, even the brew head itself by using the Flush button 54. Fill the container to approximately half full on the sight glass with hot water and wait at least 10 minutes before draining and brewing into the dispenser.

Before making any coffee that will be transferred to a holding tank, make one full brew in each head, without coffee in the brew basket, and the Automatic transfer button 128 in the ON position. This water only brew will push hot water through all the coffee transfer hoses and components to the holding tank 144. The hot water both rinses and preheats these components. Be sure to turn on the rinse jet 300 in the holding tank 144 for several minutes for the same rinsing and preheating action used on the brewer. Finally, drain the holding tank before transferring coffee into it.

Open the drawer 356 holding the brew basket 180 very carefully and make sure there is not any hot coffee or grounds trapped inside. Remove the brew basket by first sliding the drawer 180 holding the basket 180 out of the brew head to its stop, as seen in FIG. 10C. Turn the brew basket by one handle 368 until you can reach both handles comfortably. Now grab both handles 368 and raise the basket up until it can clear the drawer 356 and remove it. If necessary, empty any old coffee grounds and clean the brew basket.

Place one paper filter in the brew basket. Into this paper filter place your ground coffee. Smooth the coffee in the filter until it is a uniform depth.

Pull the brew basket drawer out to its stop and place the brew basket into it. Rotate the brew basket and align one handle, left or right, with either front corner of the drawer. This rotation keeps the brew basket handles from hitting the brewer body when the drawer is closed. Close the drawer. The drawer will be flush with the face of the brewer when in the fully closed/brew position. Twin brewer with transfer option mounted on Counter—proceed with steps 7 & 8, skip 9 & 10. Twin brewer with transfer option mounted on Stand (for serving carts only)—proceed to steps 9 & 10. Twin brewer with transfer option mounted on Split Stand (for serving carts & dispenser drawer)—proceed with steps 7 through 10.

Open drawers holding dispensers as seen in FIG. 4C very carefully to make sure there is not any hot coffee inside the dispenser. The transfer hose will have to be parked on the side of the brew head as seen in FIG. 4B before the dispenser drawer can be opened. Due to the weight of a dispenser with coffee inside, the dispenser must be drained before removal from the drawer by one person. Two people are required, one on each handle 66H, to carefully remove a full dispenser. The empty or full dispenser can be removed from the drawer for cleaning or transportation on the 6 gallon serving cart. Remove the dispenser by fully extending the drawer and lifting the dispenser 1 inch to clear the retaining lip on top of the drawer. If necessary, empty and or clean the dispenser before starting a fresh brew.

Extend the dispenser drawer to the full open position. Place a clean and empty dispenser inside the retaining lips on the drawer with the faucet facing out. Slide the drawer back into position in the brew head. The face of the dispenser will be flush with the face of the brew basket drawer when in the proper position.

When using the 6 gallon dispenser with cart, the 18 gallon mobil serving tank, and the 24 gallon mobil serving tank (18 gal. and 24 gal. mobile serving tanks are not usable with the split stand), always insure that the coffee liners are clean and empty.

CAUTION: ALWAYS INSPECT THE COFFEE SIGHT GAUGE AND THE COFFEE LINER TO MAKE SURE IT WILL HOLD THE NUMBER OF 6 GALLON BREWS YOU INTEND TO MAKE. The carts are parked under the brew head/heads with the operator steering handles and faucets facing out. Make sure that the front face of the coffee compartment is flush with the face of the brew basket drawer. When using the 6, 18 and 24 gallon carts, make sure that the brew basket opening is above the coffee dispenser cover opening/s.

CAUTION: ALWAYS SET BOTH PARKING BRAKES ON THE CART. The brakes should be set whenever the cart is not traveling and not under "hands on control" of the operator. NEVER park the cart under the brewer with out, A) insuring it is fully in the brew position, and B) setting the parking brakes. The brakes are set by pressing your foot on the paddle 37 as seen in FIG. 1B just above and to the rear of each steerable wheel 64E. When the brakes are set, a green button extends above this paddle. This green button is the brake release button. The brakes are released for traveling by pressing the green button with you foot. For a more detailed description on using the cart, refer to the appropriate carts operation manual.

Referring back to FIG. 5B, to start the brew cycle, press the brew start switch 50. If the ready light 48 is on, the brew start switch light will start flashing and the brew cycle will start immediately. If the ready light is not yet on, the brew start switch light will turn on but not flash. The brew start switch light remains on but not flashing to alert you that the brew start has been selected and that the brew will start automatically as soon as the ready light illuminates.

Referring now to FIGS. 4B and 5A on the twin brewer with the transfer option you have the option on each brew head to select an automatic transfer of the finished coffee to a 60 gallon stationary holding tank 144 at the end of the brew cycle. First, move the transfer hose 418 as seen in FIG. 4A from the parking position on the side of the brew head you want to transfer. Insert it into the top of the sight glass 66F on the dispenser after removing the vent cap 420. Second, select the Transfer, Automatic, ON push button above the brew head you wish to transfer to holding tank activating pump 303 to pump the freshly brewed beverage form the urn through conduit 132 and into the holding tank 124. The Transfer, Automatic, ON push button 128, can be selected at any time during the brew cycle. The brew head will now automatically transfer the entire contents of the dispenser to the holding tank at the end of the brew cycle. After a brew cycle has stopped you can also transfer coffee with the manual button in 2 ways. One, select the Transfer, Automatic, ON push button and momentarily press the manual transfer button 130. This will start a timed transfer just as it would do if transfer had been selected during the brew cycle. The second method, place the Transfer, Automatic, ON push button in the OFF position and hold the manual transfer button 130 in until the transfer is complete.

You can stop the brew and transfer cycles on either side by pressing the appropriate stop button, or by pressing the appropriate power button to the off position. You can also shut down both sides at the same time by pressing the emergency stop palm switch in the center of the brewer. If you stop the brew head in the middle of a brew cycle, you will have to begin a new brew cycle from the beginning. You can not restart a brew cycle after it has been stopped. If you stop the brew head in the middle of a transfer cycle you can finish the transfer by holding in the Transfer, Manual push button 130.

Pressing the Emergency stop push button 442 will remove power to the brewer and cancel all functions on both sides. If the problem can be isolated to one side only, the power switch to the offending side can be turned off and the emergency stop switch reset. This will allow the good side of the brewer to continue to function.

Carefully inspect and empty the brew basket as soon as rapid dripping has stopped and you are sure that there is no longer any water trapped above the coffee bed in the brew basket.

For overnight/short term storage of the brewer and dispensers do the following. Make one full brew in each head, without coffee in the brew basket, and the Automatic transfer in the ON position. This water only brew will push hot rinse water through all coffee barring tubes and components to the holding tank. This will leave only clean fresh water in the pump and lines. Remove the brew basket and wipe the area above the basket with a cloth to remove the coffee oils that collect there. Brew systems must not be left for long term storage until after a thorough cleaning.

Each brewer uses the same parts. I.E. a twin brewer is really 2 complete single brewers in the same cabinet. The computer allows both brew heads to operate on the same wall circuit breaker if need be. A twin brewer can easily be converted in the field with the transfer feature by adding the transfer kit. All holes and connections are provided.

Main control board and computer. The function of the main control board is to manage the timed functions, interface with the operators switches, remember the operator switch commands until they can carried out, system error detection, and the heater electrical power management in an integrated fashion. Each brew head has its own main control board. The main control board carries the computer and the timers. Water temperature is controlled by the thermostat exclusively but the decision of when and which water tank in a twin brewer is allowed to heat is made by the main control board. Water level in the hot water tank/s is sensed by the liquid level control boards dedicated to each tank. The main control board monitors the LLC to insure the brewer is ready for the next brew cycle and inhibits the fill cycle during the brew cycle.

Fill system/liquid level control board. The function of the fill system is to control the incoming water so as to maintain a sufficient amount of water in the brewer to complete a coffee brew cycle. Each brew head has a separate hot water tank and each tank has its own liquid level control board (LLC). The LLC controls the hot water tank water inlet valve and provides status reports to the main control board. The LLC uses 2 water sensing probes, one upper and one lower. The water inlet valve is opened until both probes are touching water. The lower probe is used to sense the presence of enough water in the tank to allow the heaters to come on without danger of burning the heaters out. When water is not felt by the lower probe, the LLC signals the main control board to prevent the heaters from coming on. The upper probe senses when the hot water tank is full to the brew level. When the upper probe senses water, it turns off the water inlet valve and signals the main control board to allow the next brew cycle. During the brew cycle, the water inlet valve is inhibited by the main control board from refilling the hot water tank. When water is taken from the hot water tank during the activation of the flush button, the LLC automatically refills the tank to the brew level again.

Heating system. The function of the heating system is to bring the temperature of the incoming water up to the proper degree to brew coffee. Each brew head has a separate hot water tank and each tank has its own thermostat. The thermostat is preset at the factory to 205 degrees F. The thermostat operates independently of other systems in the brewer but can be inhibited from heating in 3 ways. 1) if there is not enough water in the hot water tank to reach the lower water level probe, as in the first start up after installation or loss of water supply, heat is inhibited by the LLC via the main control board. 2) during the brew cycle, heat is inhibited by the main control board. 3) if the main control boards on two brew heads are connected by a communications cable, the main control board will allow only one set of heaters to draw from the incoming power source at a time. Which ever tank calls for heat first will lock out the other tank until it is done. The second tank will begin heating as soon as the first tank finishes. The thermostat will attempt to heat whenever the water falls below 204 degrees.

Dispense systems. The function of the dispense system is to deliver brew water to the brew basket to accomplish the brewing of coffee. The dispense system for each brew head is comprised of a brew valve and brew timer, a bypass valve and bypass timer, the spray disc and bypass donut, and the hot water tank. The main control board interfaces the operator brew start and brew stop buttons to these valves. The flush button opens these two valves directly and does not go through the main control board. The maximum water volume of 6 gallon is permanently set by the factory by way of the position of the brew and bypass valve at the 6 gallon level on the side of the hot water tank. The brew timer is set to hold the brew valve open until the 6 gallons has drained from the tank. On models with the transfer feature, the brew time is extended beyond what is required to finish a 6 gallon drain to delay the transfer pump cycle. This delay time (brew time extension) is set to allow the coffee transfer pump to begin at such a time as to allow the pump to finish shortly after dripping from the brew basket stops. These steps in the timing cycles allow transfer brewers to be adjusted for maximum brew volume per hour. The main control board on all brewers inhibits the LLC from refilling the hot water tank until the brew and bypass valves close. This interaction of valve position and tank filling guarantees that the brew volume is both repeatable and predictable. The repeatable and predictable nature of the dispense system allows the timer to be set to allow any amount of brew temperature water up to 6 gallons to drain as well. The brew valve empties onto the spray disc. The spray disc separates the brew water into a large number of separate streams to shower the entire surface of the coffee bed in the brew basket with hot water. The bypass timer is set to hold the bypass valve open to achieve the desired percentage of bypass. The bypass valve empties the bypass water into the bypass donut where it is diverted around the coffee bed in the brew basket and into the coffee container along with the brewed coffee. From 0 to 40% of the brew water volume can be diverted in this manor. The main control board can delay the start of the brew cycle until the brewer is ready. I.E. proper temperature, full water tank, and the transfer if applicable is complete.

Transfer systems. The transfer system consists of the transfer pump, transfer timer, and transfer pickup hose with sight glass adapter. Each brew head has a separate transfer system. The transfer system is activated in three different ways. One, when the automatic transfer switch is in the ON position, the main control board will cause the transfer pump to run automatically for the amount of time set on the transfer timer at the end of each brew cycle. Two, the timed transfer cycle can be started at any time by placing the automatic transfer switch in the ON position and momentarily pushing the manual transfer button. The third way to start the transfer pump is to push the automatic transfer switch to the OFF position and hold the manual transfer button for as long as required to complete a stopped transfer or to clear preheating water from the container. The transfer cycle does not delay the hot water tank from heating or filling but will delay the start of the next brew cycle until the transfer pump is off.

The power SWITCH 46 (ON/OFF), extended push button, latching switch. The power on/off switch light is on with the switch in the on position. The switch turns the power on/off only to the brew head below the switch.

The ready light 48' is on when the hot water tank connected to the brew head below the light is full of water, and water is up to the proper temperature, and when the transfer, if selected, has finished. The transfer function does not delay the fill or heating functions. Each brew head on the brewer has a ready light. How long it takes for the ready light to come on the first time each day and between brews depends on the electrical specifications issued when the brewer was ordered. Depending on the electrical power available, twin brewer may be configured to allow only one brew head to heat up at a time. This delay in the heating process is important only during a cold start when the first brew head must come up to temperature before the other head can start to heat. After a cold start heat delay, the normal heat delay drops to only a few minutes. Depending on the electrical power and water temperature available, the normal heat delay may not be noticed by the operator.

The brew start switch 50, momentary push button, with light 50'. To speed the brew cycle, the Brew/Start can be selected before the brew head is ready. If the Brew/Start is selected before the brew head is ready, the Brew/Start light will turn on and remain on while waiting for the brew head to become ready. Three conditions must be met before the brew head will become ready and start the brew cycle. The tank must be full of water, and the water must be up to temperature and the automatic transfer if selected must finish its cycle. If the Brew/Start switch has already been pushed, the brew head will automatically start the brew cycle when these three conditions have been satisfied. The Brew/Start light will flash during the actual brew cycle.

The stop switch 52, momentary push button, no light. This switch stops and cancels the brew and or transfer cycles of the brew head below the switch. The brew transfer cycle can not be restarted from the point that they were stopped. If the brew cycle is canceled, you must start over. If the transfer cycle is canceled you can finish the transfer with the manual transfer push button.

The transfer switch 128 (ON/OFF), latching push button, with light. The light is on, but not flashing, when the automatic mode has been selected for the brew head below the switch and then flashes during the automatic transfer cycle or while the manual transfer button is held down. The transfer cycle will begin automatically when the brew cycle has finished and drip out from the brew basket is nearly complete. Drip out should be completed before transfer has finished. A complete transfer can be started at any time by placing this switch on the ON position and momentarily pressing the manual transfer button.

The transfer manual switch 130 (HOLD), momentarily push button, no light. The transfer pump connected to the brew head under the button will run for as long as this button is pressed. The automatic transfer on/off switch will flash while the transfer pump is running. A complete transfer can be started at any time by placing the automatic transfer switch in the ON position and momentarily pressing the manual transfer button. The manual transfer button can be used to move coffee into the holding tank at any time. This button can also be used after flushing the brew head into the dispenser to rinse the transfer pump and lines to holding tank.

The flush switch 54 (HOLD), momentary push button, no light. Press and hold the flush button to open both the brew and bypass valves in the brew head under the button. Hot, brew temperature, water will flow into and through the brew basket and bypass donut into the dispenser for as long as this switch is pressed. This function is used primarily to rinse the brew head at the end of the operating cycle, shift, or day. Flush can also be used to preheat the brew head and dispensers before their first use of the day.

CAUTION: You can overfill the Dispenser if you hold this button in long enough.

NOTE: After flushing each brew head into dispensers, we suggest you use the manual transfer buttons to rise the transfer pumps and lines to holding tank. After the manual transfers are completed, open the rinse jet in each holding tank and finally drain the holding tank/tanks.

The emergency stop switch 442 (PULL TO RESET) latching palm size push button, with light. Push the emergency stop button to disconnect all electrical circuits and cancel all functions in the brewer. Pull the emergency stop button to reset the brewer. The emergency stop button light is on when the button is pushed in to the stop position. The emergency stop button should not be reset until after, A) the fault has been isolated to the offending side and the appropriate power switch has been turned off. This will allow the good side of the brewer to still be used before repairs are accomplished, or B) the emergency situation has been identified and resolved.

10 AMP CIRCUIT BREAKER (PUSH TO RESET), protection is provided to each brew heads electrical components and function switches by separate 10 amp. breakers.

2 AMP CIRCUIT BREAKER (PUSH TO RESET) This breaker is connected just before each heads transfer pump and will isolate the pump from the rest of the brew head. Should the pump fail, the brew head can still be used to brew directly into a dispenser or cart.

Tank temperature is set at the factory at 7 degrees F. below boiling or 205 degrees F. at sea level. This adjustment must be reduced at altitude by the same 7 degrees from the boiling point of water at your altitude. Actual brew water temperature will be reduced by the heat transfer of the dispense components to the desirable temperature of 195 degrees F.

Brew Timer. (front timer) Adjustable in one second increments

The time required on this adjustment will need to be the minimum time required to clear the hot water tank of the complete 6 gallons needed for brewing. Brewers with the transfer option will require additional time (variable to each coffee, grind, weight, and spray disc selected) needed for drip out. The object of this additional time is to delay the transfer start time long enough to insure the transfer finish time is only slightly longer than the time needed for the brew basket to finish rapid dripping. The proper amount of time added to the minimum brew time insures that the transfer will be complete and that the dispenser will be empty for the next brew. If the additional time is longer than needed, the gallons per hour of coffee production will be reduced unnecessarily. Always inspect the dispenser to verify that a transfer was successful before starting another brew cycle. Remember that the transfer time is also adjustable and will effect this adjustment slightly.

Bypass Timer. (middle timer) Adjustable in one second increments.

Transfer Timer. (back timer) Adjustable in one second increments

Transferring coffee from the dispensers is a very fast process. Transfer can be automatically started at the end of the brew cycle or manually transferred at any time by holding the manual switch down. The brew timer setting will determine the start of the transfer timed cycle. The transfer timed cycle could be considered a fixed time. However, the brew timer must be set so that the transfer timer will stop shortly after the brew basket has stopped rapid dripping. Remember that the brew timer does not control the brew water volume. Brew water volume is factory set by the dispense fitting location in the hot water tank. The brew timer determines how long the brew dispense valve remains open after the brew water volume has passed. The time on the brew timer is extended past the time required for brew water delivery to delay the start of the transfer timer.

The actual transfer time will very slightly due to the length of the delivery hose used to connect to the holding tanks. The transfer timer should be adjusted to the minimum time needed to complete the transfer. The brewer computer will prevent another brew until the transfer is completed.

Proceed as follows to adjust a brewer with the transfer option.

Transfer auto on/off switch in the off position. Complete a brew, with coffee, into a 6 gallon dispenser and record the total time required including drip out of the brew basket. You will need to judge for yourself what level of dripping from the basket is acceptable when stopping the total time.

Manually transfer the finished brew from the dispenser to the holding tank. The timing should be stopped when air clears the lines connecting the brewer to the tank. Record the total transfer time.

Subtract the total transfer time from the total brew time to get the total seconds needed to be entered on the BREW timer.

Brew water to coffee contact time.

Coffee contact time can be controlled by the size and total number of holes placed in the spray disc on the spray assembly.

Leveling.

It is very important that the brewers, counters and stands be leveled with an accurate spirit level. Each brewer, counter, and stands have adjustable feet. Leveling must be done prior to bolting the feet down. If the foot mounting holes for bolting are not aligned with the holes provided when the brewer is level, a slightly back lean is preferred to any forward leaning of the brewer. (define maximum travel from full in to a full out. I.E. number of turns.)

3 kinds of actuators, 1 kind of lamp holder, 1 kind of coupling, 1 kind of cover Ready, Start, and transfer lamps will flash at the same time when there is a computer error.

Each light has a 1 W 1100 ohm resister attached ahead of the light. This reduces voltage to the light to 90 volts. This voltage reduction extends light life by 5×.

POWER switch 46 (ON/OFF) single contact N.O., extended button, latching, Lamp 46' on with switch in the on position. Turns power on/off only to the brew head below switch READY lamp 48' (To BREW) lamp only, lamp on when tank is full of water, and when water is up to temperature. Indicates ready to brew for brew head below lamp.

BREW switch 50 (START) single contact N.O., momentary button. Start/brew can be selected before the brewer is ready. Start/brew Lamp 50' will remain on while waiting for brew to start (when temp., water, or transfer are not yet ready). When the tank is full of water, proper temperature has been reached, and the transfer has completed if applicable, the brew will start automatically. The lamp will flash during the actual brew cycle.

STOP switch (BREW or BREW/TRANSFER) single contact N.C., momentary button, no lamp. Interrupts and or Resets brew and transfer functions previously selected.

TRANSFER-AUTOMATIC switch 128 (ON/OFF) single contact N.O., latching, Lamp 128' on when auto mode is selected and flashes during transfer cycle. Used on brewers with transfer only. Transfer will begin automatically when the brew has finished and drip out is nearly complete. Drip out should be completed before transfer has finished. A complete transfer can be started at any time by placing this switch in the ON position and momentarily pressing the manual transfer button.

TRANSFER-MANUAL switch 130 (HOLD) single contact, N.O., momentary button, no lamp. Used on brewers with transfer only. Transfer pump will run for as long as this switch is pressed. The automatic transfer on/off switch will flash while the transfer pump is running. A complete transfer can be started at any time by placing the automatic transfer switch in the ON position and momentarily pressing the manual transfer button. Can be used to move coffee into the holding tank at any time or after flushing the brew head to rinse the transfer pump and lines to holding tank.

FLUSH switch 54 (HOLD) 2 contacts, N.O. momentary, no lamp, press and hold to energize both brew and bypass valves. Hot brew water will flow into the brew basket and bypass donut for as long as this switch is pressed.

EMERGENCY STOP switch 442 (PULL TO RESET) 2 ea. contacts N.O./N.C. push to open circuit and pull to reset, lamp is on when the button is pushed in to the stop position. Used on brewers with transfer only. The E stop terminates all functions in the brewer. Only the hot side of the mercury relay and the wire to the E stop switch will have voltage when in the stop position. The E stop should not be reset until after, A) the fault has been isolated to the offending side and the appropriate power switch has been turned off. This will allow the good side of the brewer to still be used before repairs are accomplished, or B) the emergency situation has been identified and resolved.

10 AMP CIRCUIT BREAKER (PUSH TO RESET) Control board power comes from the incoming electrical terminal block, through the E stop switch on AT models, to the 10 amp breaker, then to the power switch for the appropriate head in the brewer. Each brew head has its own 10 amp breaker. For A models (no transfer) it goes from the terminal block, to the breaker, to the power switch.

2 AMP CIRCUIT BREAKER (PUSH TO RESET) This breaker is connected just before the transfer pump and will isolate the pump from the rest of the brewer. Should the pump fail the brewer can still be used to brew directly into a dispenser or cart.

Main control board and computer. EPROM software.

3 identical timers that are interchangeable between any position,

Front=brew valve timer, set in seconds to insure a complete 6 gallon drain through the dump valve. This timer is extended on AT models to delay the start of the transfer pump.

Middle=bypass valve timer, set in seconds to obtain from 0 to 40% of bypass. A change in the bypass timer will require a change in the opposite direction on the brew timer. refer to Back=transfer pump timer, set in seconds to insure a completely empty dispenser and lines. This time will vary in accordance to the length of the transfer hoses.

All incoming and outgoing signals easily traced to connectors.

The stand alone jumper can be used for service but only one jumper at a time to prevent both heaters to draw incoming power at a time.

Same board can be used in all models left or right. However, you can't interchange domestic and export voltage boards or components.

Communication cable has three wires, transmit, receive, and ground. The end of the cord with a loop designates that board as the slave. If the communication link is broken the slave is disabled. If the incoming power circuit breaker is large enough to supply both hot water tanks a stand alone jumper is plugged into each of the main control boards to allow them to act independently of each other. If an error is detected during a brew, the brew is allowed to finish but that brew head is disabled. Errors can be reset by powering down the brewer (both heads on a twin brewer) and powering it back up again.

Fill system/liquid level control board.

Controlled by a dual probe liquid level board. std. to our HWBs.

Tank does not refill during the brew cycle.

This allows the dispense valve to precisely control the amount of water coming through because the standing water pressure is known for all water quantities from 0 to 6 gallons.

Tank does refill automatically during and after flushing.

Fill valve is std. S-45. one for each side, as necessary, tied to a ⅜ T fitting.

Unaffected by water pressure or flow rate.

Brewer will not brew until the tank has sufficient water regardless how long it takes to fill and therefore all brews will be exactly 6 gallons. The dump valve is located at a point exactly 6 gallons below the full tank level. The brew timer is set to insure that the dump valve is open long enough to allow all 6 gallons to drain out. The valve time is extended beyond what is required to finish a 6 gallon drain, on AT models, to delay the transfer pump. This delay time set to allow the coffee transfer pump to begin at the right time to allow the pump to finish shortly after drip out from the brew basket. These steps in the timing cycles allow the brewer to be adjusted for maximum brew volume per hour.

Refilling the hot water tank is prevented until the brew dump valve has closed, indicating the end of the brew cycle. See the dispense system for filling the dispensers.

Heating system.

Hot water tanks on all brewers, left or right side are identical 18 gallon tanks.

Standard thermostat and probe can be used. Production thermostat may have connectors mounted on the other side for ease of assembly.

Heaters are 10 kw 240 V, 5 kw 240 V, 10 kw 480

Mercury relays are 80 amp 3 ph, 60 amp 3 ph,

Both hot water tanks and heaters in the twim brewer 30 and twin brewer 30 with transfer option are connected to one breaker. The computer controls the relays and allows only one tank to heat at a time. I.E. 2 tanks drawing 31 amps each can be connected to one 50 amp breaker, or both can heat at the same time if connected to a 80 amp breaker. Heater configurations can be installed to maximize incoming power.

Dispense systems.

The sprayhead disperses the brew water from the brew dump valve over the coffee bed by 37 evenly spaced holes like a hot rain shower.

Transfer system.

Transfer is accomplished by a ¼ hp self priming pump.

Each pump is connected to a 2 amp circuit breaker.

While a detailed description of the brewing systems and method has been described with reference to the brewing of coffee, it should be appreciated that coffee is merely an example of a number of different types of ingredients that can be employed with the brewers of the invention to create a brew, such as tea and cocoa. In addition, although the best mode of practicing the invention has been described, it shall be appreciated that the invention is not merely limited to such details.

I claim:

1. In a brewing system, having a hot water tank and means for heating water contained in the hot water tank, the improvement comprising:

a thermally insulated removable urn movable away from the hot water tank after receipt of freshly brewed beverage for storage away from the hot water tank;

means for flushing the thermally insulated removable urn with hot water from the hot water tank to preheat the thermally insulated removable urn prior to receipt of the freshly brewed beverage, including a brew valve, a controller with a brew start switch, a flush switch, and means responsive to actuation of the flush switch to open the brew valve independently of the brew start switch to pass hot water from the hot water tank to the urn.

2. The brewing system of claim 1 in which said flush switch is biased to return to a nonactuated state when not manually held in an actuated state.

3. The brewing system of claim 1 in which said means for flushing includes means for flushing a brew basket with hot water.

4. The brewing system of claim 3 including another valve, and means for opening the other valve in response to actuation of the flush switch.

5. The brewing system of claim 4 in which said other valve is located adjacent a side of the brew basket, to direct hot water down the side of the brew basket.

6. In a brewing system, having a hot water tank, means for heating water contained in the hot water tank and a brew basket for holding brew material, the improvement comprising:

a by-pass valve for selectively by-passing hot water past the brew material within the brew basket;

a brew valve for selectively passing hot water through the brew material when loaded in the brew basket;

a flush switch, and means responsive to actuation of the flush switch for opening both the brew valve and the by-pass valve to maximize the flow of hot water through the brew basket and into an urn to flush the urn with hot water.

7. The brewing system of claim 6 in which the by-pass valve is located adjacent a side of the brew basket to pass hot water along the side of the brew basket.

8. The brewing system of claim 7 in which the flush switch is biased to return the switch to a nonactuated position after a selected period of time.

9. The brewing system of claim 8 in which the flush switch controls both valves independently of the brew switch.

10. The brewing system of claim 7 in which the by-pass valve passes the hot water into an annular trough with holes along perimeter of the trough for even flow of the hot water to flush a side of the brew basket.

* * * * *